(12) United States Patent
Chenna Madhavuni et al.

(10) Patent No.: US 12,165,550 B2
(45) Date of Patent: Dec. 10, 2024

(54) REPROJECTION OPTIMIZATION BASED ON CONTEXTUAL BRIGHTNESS

(71) Applicant: QUALCOMM Incorporated, San Diego, CA (US)

(72) Inventors: Rakesh Raju Chenna Madhavuni, San Diego, CA (US); Wesley James Holland, Encinitas, CA (US); Simon Peter William Booth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/521,414

(22) Filed: Nov. 28, 2023

(65) Prior Publication Data

US 2024/0363043 A1 Oct. 31, 2024

Related U.S. Application Data

(60) Provisional application No. 63/498,800, filed on Apr. 27, 2023.

(51) Int. Cl.
G09G 3/00 (2006.01)
G02B 27/00 (2006.01)
G02B 27/01 (2006.01)

(52) U.S. Cl.
CPC ......... *G09G 3/002* (2013.01); *G02B 27/0093* (2013.01); *G02B 27/0172* (2013.01);
(Continued)

(58) Field of Classification Search
CPC ........... G09G 3/002; G09G 2320/0626; G09G 2340/16; G09G 2354/00; G02B 27/0093;
(Continued)

(56) References Cited

U.S. PATENT DOCUMENTS

2010/0103172 A1   4/2010  Purdy, Sr.
2012/0133673 A1*  5/2012  Ninan ................. H04N 9/3126
                                            345/599
(Continued)

OTHER PUBLICATIONS

International Search Report and Written Opinion—PCT/US2024/021315—ISA/EPO—May 24, 2024.

*Primary Examiner* — Andrew Sasinowski
(74) *Attorney, Agent, or Firm* — QUALCOMM Incorporated

(57) ABSTRACT

Aspects presented herein relate to methods, devices, and apparatuses for display processing. The apparatus may obtain a first intensity map associated with first luminance information for a scene. The apparatus may also configure a second intensity map based on the first intensity map and at least one coordinate frame from a perspective of a user of a device for display content associated with the scene. The apparatus may also determine whether luminance information for at least one region in the second intensity map is within a suitable luminance range for the display content associated with the scene. The apparatus may also process a set of pixels corresponding to a section in a display associated with the at least one region based on the luminance information being at least one of: within the suitable luminance range, outside of the suitable luminance range, or within an indistinguishable luminance range.

30 Claims, 17 Drawing Sheets

(52) U.S. Cl.
CPC ............... *G02B 2027/0112* (2013.01); *G02B 2027/013* (2013.01); *G09G 2320/0626* (2013.01); *G09G 2340/16* (2013.01); *G09G 2354/00* (2013.01)

(58) Field of Classification Search
CPC ........ G02B 27/0172; G02B 2027/0112; G02B 2027/013
See application file for complete search history.

(56) References Cited

U.S. PATENT DOCUMENTS

| | | | |
|---|---|---|---|
| 2012/0194433 A1 | 8/2012 | Imai | |
| 2017/0124928 A1* | 5/2017 | Edwin | G02B 27/017 |
| 2018/0109783 A1* | 4/2018 | Austin | G01M 11/04 |
| 2018/0211440 A1 | 7/2018 | Kunkel et al. | |
| 2020/0105221 A1* | 4/2020 | Marcu | G06T 5/92 |

\* cited by examiner

FIG. 8

REPROJECTION OPTIMIZATION BASED ON CONTEXTUAL BRIGHTNESS

CROSS REFERENCE TO RELATED APPLICATION(S)

This application claims the benefit of and priority to U.S. Provisional Application Ser. No. 63/498,800, entitled "REPROJECTION OPTIMIZATION FOR SPLIT ARCHITECTURES" and filed on Apr. 27, 2023, which is expressly incorporated by reference herein in its entirety.

TECHNICAL FIELD

The present disclosure relates generally to processing systems and, more particularly, to one or more techniques for content reprojection for split architectures.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be any apparatus that may perform display processing (e.g., a GPU, CPU, or DPU). The apparatus may obtain a first intensity map associated with luminance information for a scene including a plurality of frames, where the first intensity map corresponds to a camera associated with the scene. Additionally, the apparatus may configure a second intensity map based on the first intensity map and at least one coordinate frame from a perspective of a user of a device for display content associated with the scene, where the second intensity map is associated with the luminance information for the scene. The apparatus may also determine whether luminance information for at least one region in the second intensity map is within a suitable luminance range for the display content associated with the scene. Also, the apparatus may identify the section in the display that is associated with the at least one region based on the luminance information for the at least one region being within the suitable luminance range or outside of the suitable luminance range, and where processing the set of pixels comprises process the set of pixels based on the identification of the section in the display. The apparatus may also filter the luminance information for the at least one region in the second intensity map if the luminance information for the at least one region is within the suitable luminance range. Further, the apparatus may process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range. The apparatus may also output an indication of the set of processed pixels or the set of estimated transformation parameters. The apparatus may also transform display content corresponding to the at least one region in the second intensity map based on the set of estimated transformation parameters. The apparatus may also adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 8 is a diagram illustrating an example processing flow.

DETAILED DESCRIPTION

Figure 1:
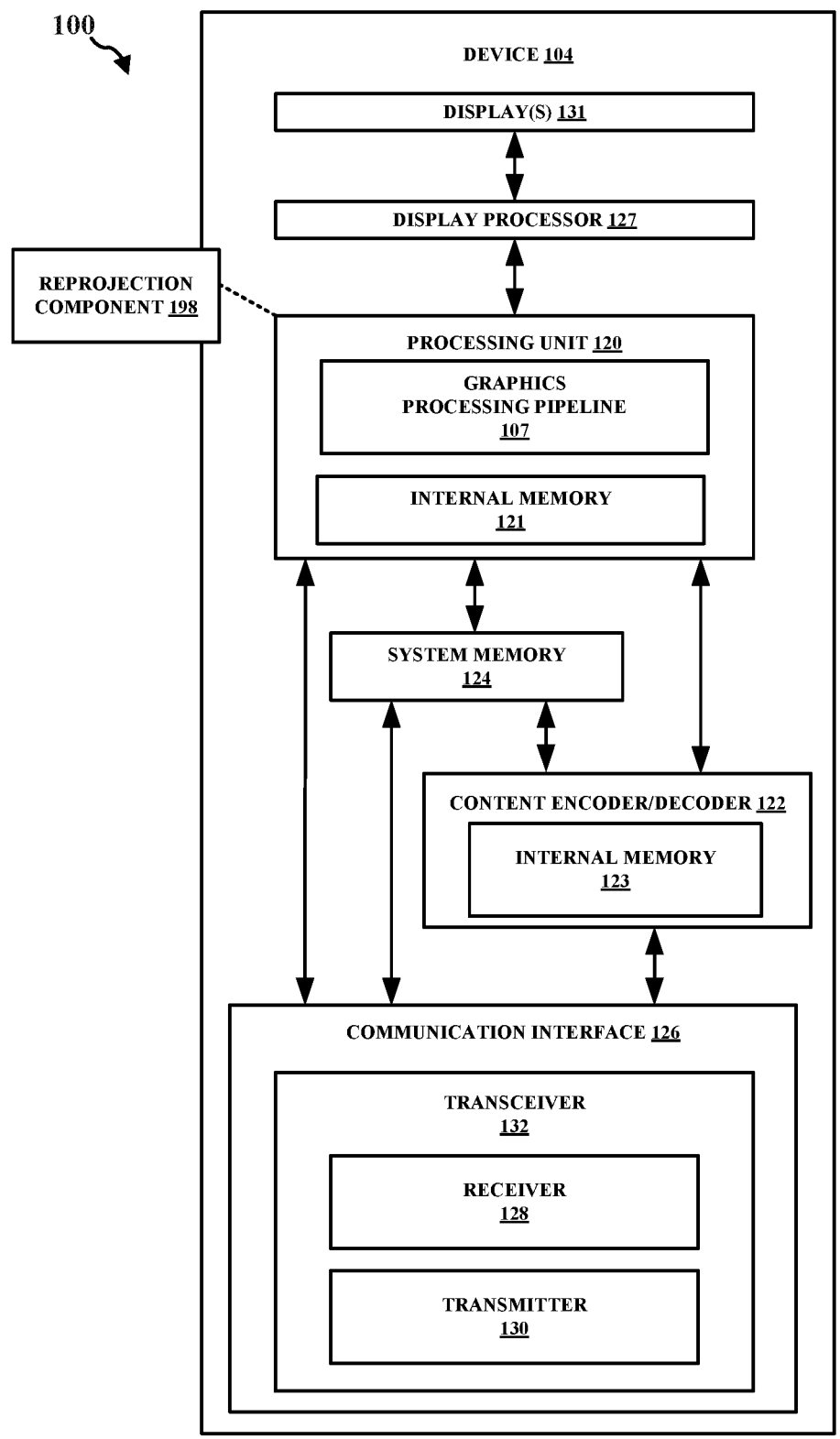
FIG. 1 is a block diagram that illustrates an example content generation system.

Aspects of split architecture may include a late stage reprojection. For instance, eye and depth frames may be rendered on the companion device for each eye (left, right). Also, the device/glass may receive these frames, decodes the frames, processes the frames, and/or send the frames to the display. Further, the user might move during this time and the rendered objects may be displayed at different places in the scene compared to what the user expects. In order to account for this user motion and minimize visual discrepancy, the device may warp the eye buffers based on the latest available pose information. In some aspects, light/brightness aware rendering may enhance the visual appeal of the virtual content and may make the scene more immersive. Also, virtual objects may have varying complexities which can be visible to the user under certain lighting conditions (e.g., lighting conditions assumed during rendering). However, when the brightness of the scene substantially changes compared to rendered time, these finer details in the virtual object may not be discernable to the user. For instance, a reprojection pipeline may not be aware of these relative brightness changes, which may lead to over-computation. Aspects of the present disclosure may reduce the computational complexity in such scenarios (e.g., when the brightness of the scene substantially changes compared to rendered time). By reducing the computational complexity when the brightness of the scene substantially changes compared to rendered time, aspects presented herein may reduce the bandwidth on memory/interconnect. Further, by reducing the computational complexity when the brightness of the scene substantially changes compared to rendered time, aspects presented herein may potentially allow for an overall reduction in power consumption.

Aspects presented herein may include a number of benefits or advantages. For instance, aspects presented herein may reduce the computational complexity in such scenarios (e.g., when the brightness of the scene substantially changes compared to rendered time). By reducing the computational complexity when the brightness of the scene substantially changes compared to rendered time, aspects presented herein may reduce the bandwidth on memory/interconnect. Moreover, by reducing the computational complexity when the brightness of the scene substantially changes compared to rendered time, aspects presented herein may potentially allow for an overall reduction in power consumption.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a reprojection component 198 configured to obtain a first intensity map associated with luminance information for a scene including a plurality of frames, where the first intensity map corresponds to a camera associated with the scene. The reprojection component 198 may also be configured to configure a second intensity map based on the first intensity map and at least one coordinate frame from a perspective of a user of a device for display content associated with the scene, where the second intensity map is associated with the luminance information for the scene. The reprojection component 198 may also be configured to determine whether luminance information for at least one region in the second intensity map is within a suitable luminance range for the display content associated with the scene. The reprojection component 198 may also be configured to identify the section in the display that is associated with the at least one region based on the luminance information for the at least one region being within the suitable luminance range or outside of the suitable luminance range, and where processing the set of pixels comprises process the set of pixels based on the identification of the section in the display. The reprojection component 198 may also be configured to filter the luminance information for the at least one region in the second intensity map if the luminance information for the at least one region is within the suitable luminance range. The reprojection component 198 may also be configured to process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range. The reprojection component 198 may also be configured to output an indication of the set of processed pixels or the set of estimated transformation parameters. The reprojection component 198 may also be configured to transform display content corresponding to the at least one region in the second intensity map based on the set of estimated transformation parameters. The reprojection component 198 may also be configured to adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold.

Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
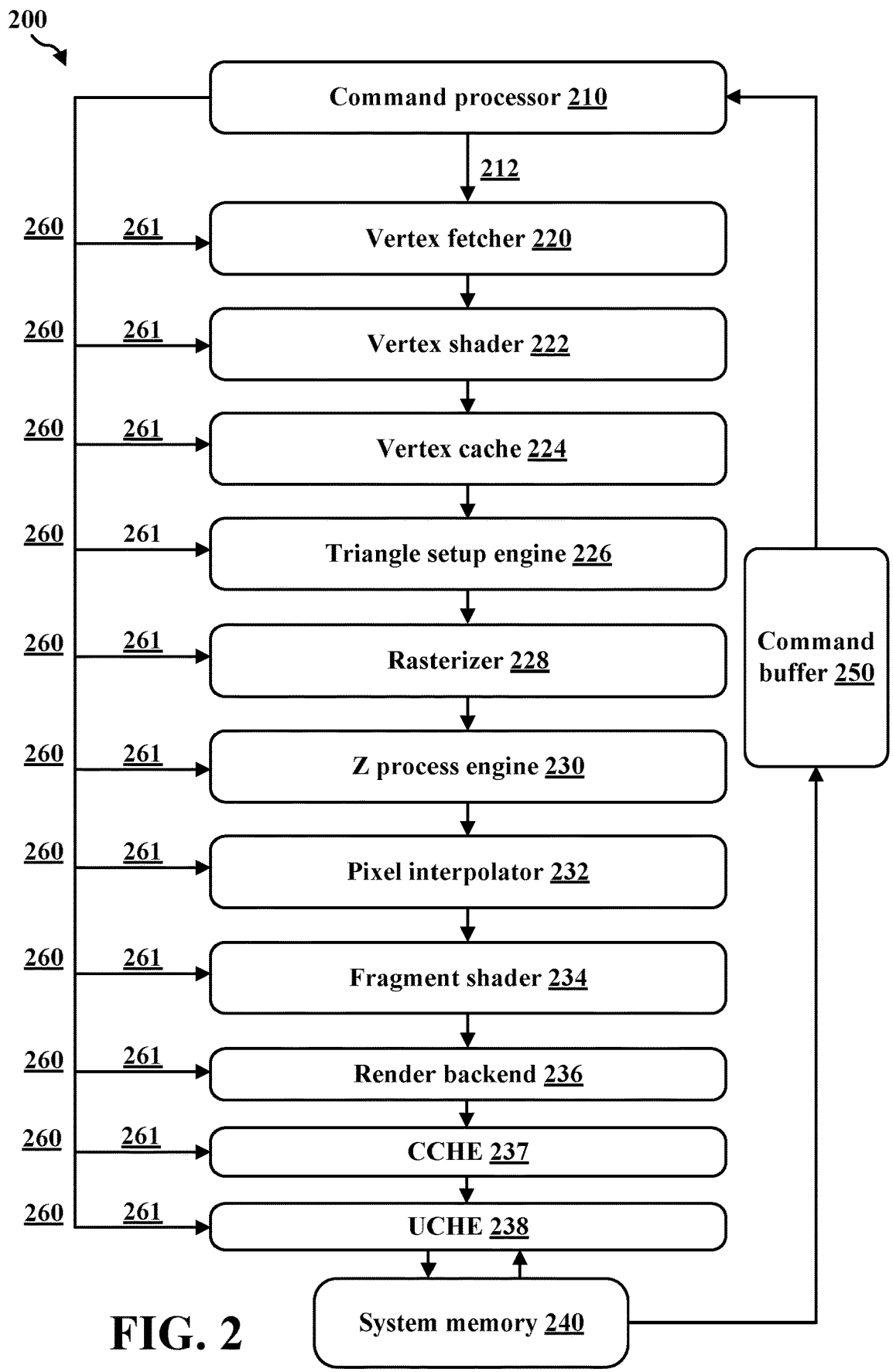
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Figure 3:
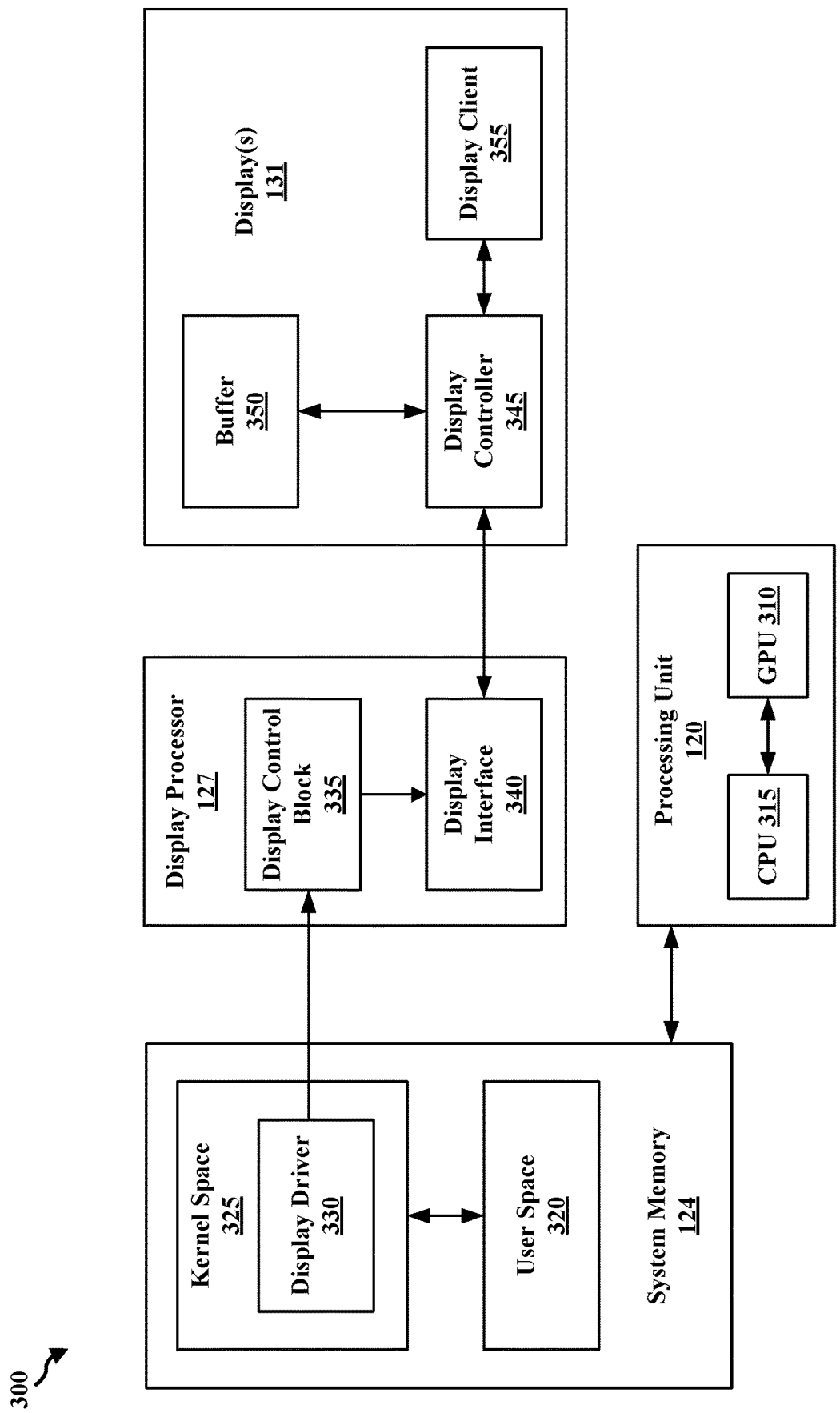
FIG. 3 is a diagram illustrating example processing components.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
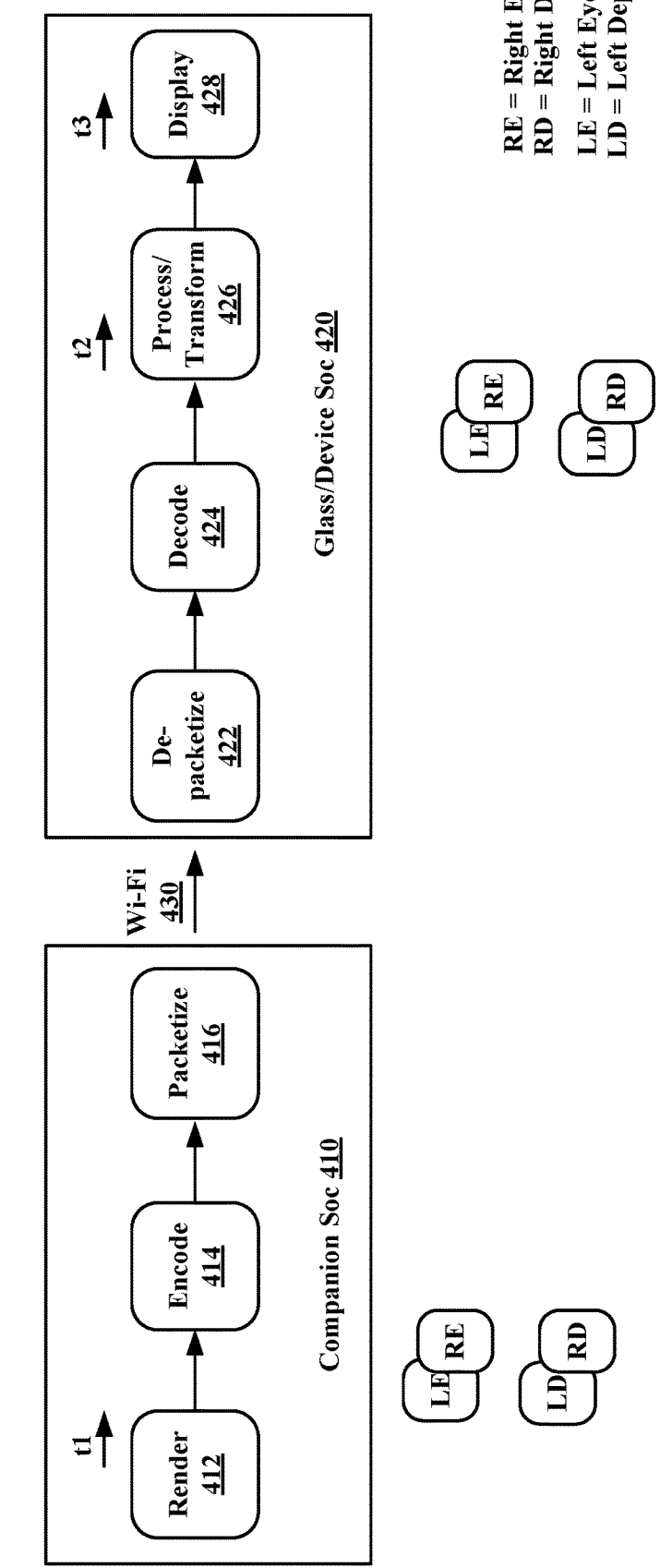
FIG. 4 is a diagram illustrating an example split architecture.

FIG. 4 is a diagram 400 illustrating an example split architecture. More specifically, FIG. 4 depicts a general split architecture 402, such as a split augmented reality (AR) architecture or a split extended reality (XR) architecture. As shown in FIG. 4, diagram 400 including general split architecture 402 includes a number of different steps, such as: render 412, encode 414, packetize 416, de-packetize 422, decode 424, process/transform 426, and display 428. FIG. 4 shows that a companion system on-chip (SoC) 410 may perform render 412, encode 414, packetize 416 steps. Also, a glass/device SoC 420 may perform the de-packetize 422, decode 424, process/transform 426, and display 428 steps. Additionally, FIG. 4 shows a first time (t1), a second time (t2), and a third time (t3). The first time (t1) may occur during the render 412 step, the second time (t2) may occur during the process/transform 426 step, and a third time (t3) may occur during the display 428 step. Further, there may be a Wi-Fi connection (e.g., Wi-Fi 430) between the processing steps at companion SoC 410 and the processing steps at glass/device SoC 420. FIG. 4 also depicts different eyes and depths for a display device in the split AR architecture. For instance, diagram 400 shows a right eye (RE), a right depth (RD), a left eye (LE), and a left depth (LD). As shown in FIG. 4, the steps for right eye (RE), right depth (RD), left eye (LE), and left depth (LD) may occur during the processing steps at companion SoC 410 and the processing steps at glass/device SoC 420.

As shown in FIG. 4, the companion SoC 410 may first perform the render 412 step. This step may occur during the first time (t1). After the render 412 step, the companion SoC 410 may perform the encode 414 step. In some instances, data/content associated with images/frames may be encoded during encode 414. After the encode 414 step, the data/content may then undergo a packetize 416 step (e.g., a packetization process or real-time transport protocol (RTP) packetization process). During the packetization process, the data/content may be converted to one or more frames. The frames may then be transmitted from the companion SoC 410 to the glass/device SoC 420. As shown in FIG. 4, this transmission may be performed via Wi-Fi 430. In some instances, the frames may be transmitted via a network protocol (e.g., a user datagram protocol (UDP) internet protocol (IP) (UDP/IP) network protocol). On the glass/device SoC 420, the frames may be received (e.g., received via a UDP/IP network protocol). The frames may also undergo a de-packetize 422 step or de-packetization process (e.g., a real-time transport protocol (RTP) de-packetization process), which may convert the data packets into data/content. After de-packetization, the data/content may be decoded during decode 424 step. After the decoding, the glass/device SoC 420 may undergo the process/transform 426 step. Finally, the decoded data/content may be sent to a display 428 (e.g., a headset or HMD) for display of the data/content.

As depicted in FIG. 4, aspects of split architecture may also include a late stage reprojection. For instance, as shown in FIG. 4, eye and depth frames may be rendered on the companion device for each eye (left eye and/or right eye) at a certain time instances (e.g., at time t1). Also, as shown in FIG. 4, the device/glass (e.g., glass/device SoC 420) may receive these frames and de-packetize at de-packetize 422 step, decodes the frames at decode 424 step, processes the frames at process/transform 426 step (e.g., at time t2), and/or send the frames to the display at display 428 step (e.g., at time t3). Further, the user might move or adjust a position during this time and the rendered objects may be displayed at different places in the scene compared to what is expected by the user. As further shown in FIG. 4, in order to account for this user motion and to minimize visual discrepancy, the device may warp the eye buffers based on the latest available pose information. For example, glass/device SoC 420 may undergo process/transform 426 step (e.g., at time t2).

In some aspects, certain types of rendering (e.g., light/brightness aware rendering) may enhance visual content. For instance, light/brightness aware rendering may enhance the visual appeal of virtual content and may make a scene more immersive. Also, virtual objects may have varying complexities which may be visible to the user under certain lighting conditions (e.g., lighting conditions assumed during rendering). However, when the brightness of the scene substantially changes (e.g., changes compared to a rendered time), some finer details in the virtual object may not be discernable to the user. For instance, a reprojection pipeline may not be aware of any relative brightness changes, which may lead to over-computation. Based on the above, it may be beneficial to reduce the computational complexity in such scenarios. For instance, it may be beneficial to reduce the computational complexity in split rendering architectures during changes in relative brightness. Also, it may be beneficial to reduce the amount of computation during these scenarios (e.g., changes in relative brightness).

Aspects of the present disclosure may reduce the computational complexity in certain scenarios. For example, aspects presented herein may reduce the computational complexity in split rendering architectures during scenarios when the brightness of a scene substantially changes compared to a rendered time. By reducing the computational complexity of the split rendering architecture (e.g., when the brightness of the scene substantially changes compared to rendered time), aspects presented herein may reduce the bandwidth on memory or interconnect. Further, by reducing the computational complexity when the brightness of the scene changes (e.g., substantially changes) compared to rendered time, aspects presented herein may potentially allow for an overall reduction in power consumption. As such, aspects presented herein may reduce the computational complexity at devices in split rendering architectures and/or reduce the overall power consumption at devices in split rendering architectures.

Aspects presented herein may utilize a method to reduce computational complexity at devices in split rendering architectures during certain scenarios (e.g., when the brightness of the scene substantially changes compared to rendered time). For instance, aspects presented herein may obtain a brightness map (e.g., a brightness map obtained from the camera sensors). This brightness map may help to determine the brightness in a scene, which may help to identify when a brightness of a scene will substantially change. The brightness map obtained from the camera sensors may be transformed based on eye/display coordinate frame in order to generate an updated brightness map (e.g., brightness map b1). The updated brightness map may further be processed by an application engine to determine threshold boundaries (e.g., threshold boundaries b2) based on type of content being generated. After this, a warping engine may sample the brightness map (brightness map b1 or threshold boundaries b2) that encompass the portion of a grid (e.g., a grid that the warping engine is currently processing). In some aspects, if the brightness level is within a threshold limit for that region, the warping engine may proceed to process all of the pixels in the grid according to a chosen warping procedure (e.g., warping procedure w1). In some aspects, if the brightness level is outside of a threshold limit, the warping engine may process a set of pixels (e.g., primary pixels) according to the chosen warping procedure (e.g., warping procedure w1). For the remaining pixels in the grid, the warping engine may interpolate the values of secondary pixels based on the primary pixels. In some instances, there may potentially be large brightness intensity changes in the scene. In these instances, the warping engine may avoid processing all the samples in the chosen grid, thus saving a significant amount of computation and/or power consumption.

Aspects presented herein relate to reprojection optimization based on contextual brightness. In some instances, virtual objects may have varying complexities that are visible to a user during rendering under certain lighting conditions. One issue is that the brightness of a scene may substantially change compared to the rendered time. The reprojection pipeline may not be aware of these relative brightness changes, which may lead to over-computation. Aspects presented herein may utilize a brightness map obtained from camera sensors, which may be transformed based on an eye/display coordinate frame in order to generate a new brightness map (b1). The map may further be processed by an application engine in order to determine threshold boundaries (b2) based on the type of content being generated. Also, the GPU/warping engine may sample the brightness map (b1 or b2) that encompasses the portion of a grid that the GPU/warping engine is currently processing. Depending on the brightness level and whether the brightness level is within certain threshold limits for a region, the GPU/warping engine may decide to process all of the pixels or a subset of pixels according to the chosen warping procedure (w1). Aspects presented herein may reduce the computational complexity and/or reduce the bandwidth for a memory/interconnect, which may result in an overall reduction in power consumption at the device.

Figure 5:
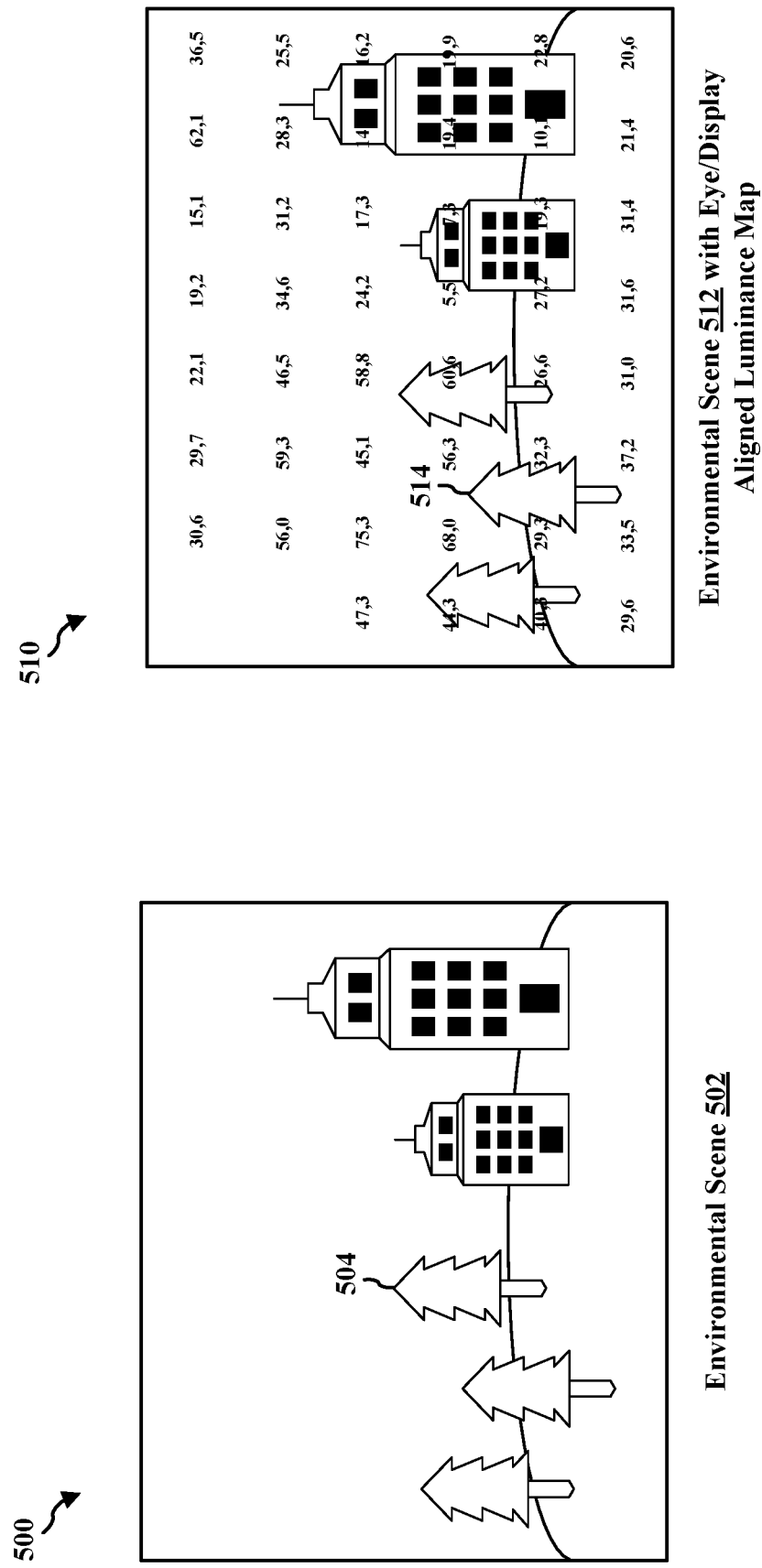
FIG. 5 is a diagram illustrating example scenes associated with display processing or graphics processing.

FIG. 5 is a diagram 500 and diagram 510, respectively, illustrating example scenes associated with display processing and/or graphics processing. More specifically, FIG. 5 depicts example environmental scene 502 in diagram 500 and example environmental scene 512 in diagram 510. As shown in FIG. 5, diagram 500 depicts an environmental scene 502 including objects 504 (e.g., trees and buildings). Likewise diagram 510 depicts an environmental scene 512 including objects 514 (e.g., trees and buildings). However, unlike diagram 500, environmental scene 512 in diagram 510 includes an eye/display aligned luminance map. As shown in FIG. 5, the eye/display aligned luminance map in environmental scene 512 includes a variety of different luminance measurements. These luminance measurements measure the luminance levels at various points in the environmental scene 512. Also, the luminance measurements of the eye/display aligned luminance map may allow aspects presented herein to determine or measure brightness intensity changes in the scene.

Figure 6:
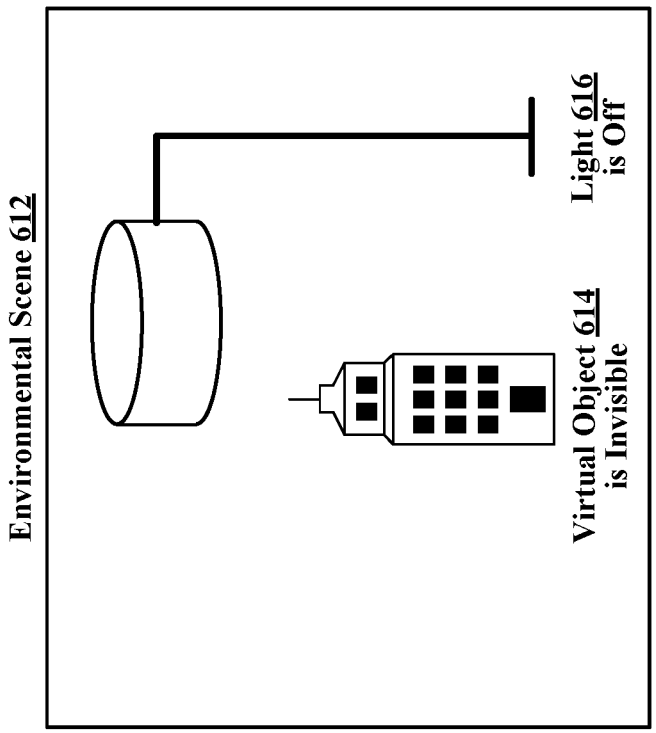
FIG. 6 is a diagram illustrating example scenes associated with display processing or graphics processing.
Figure 6:
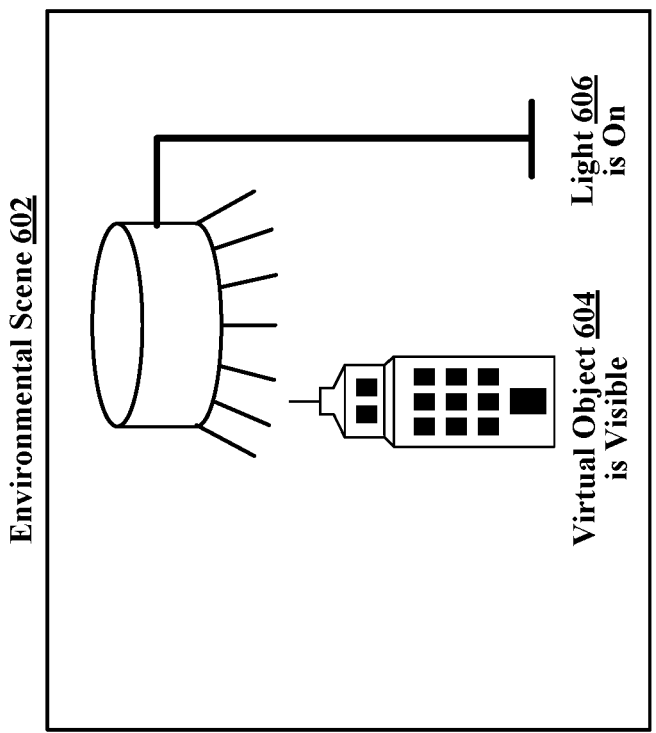

FIG. 6 is a diagram 600 and diagram 610, respectively, illustrating example scenes associated with display processing and/or graphics processing. More specifically, FIG. 6 depicts example environmental scene 602 in diagram 600 and example environmental scene 612 in diagram 610. As shown in FIG. 6, environmental scene 602 includes a virtual object 604 (e.g., a building) and a light 606. Likewise, environmental scene 612 includes a virtual object 614 (e.g., a building) and a light 616. As shown in FIG. 6, diagram 600 depicts an environmental scene 602 where a light 606 (e.g., an environmental light) is on at a time when virtual object 604 is rendered. Accordingly, the virtual object 604 is visible. Further, diagram 610 depicts environmental scene 612 where light 616 (e.g., an environmental light) is off at a display time. As such, the virtual object 614 is invisible. Indeed, as shown in diagram 610, as the light 616 is off at the display time, the virtual object 614 may not be displayed for an immersive experience (i.e., the virtual object is invisible).

Figure 7:
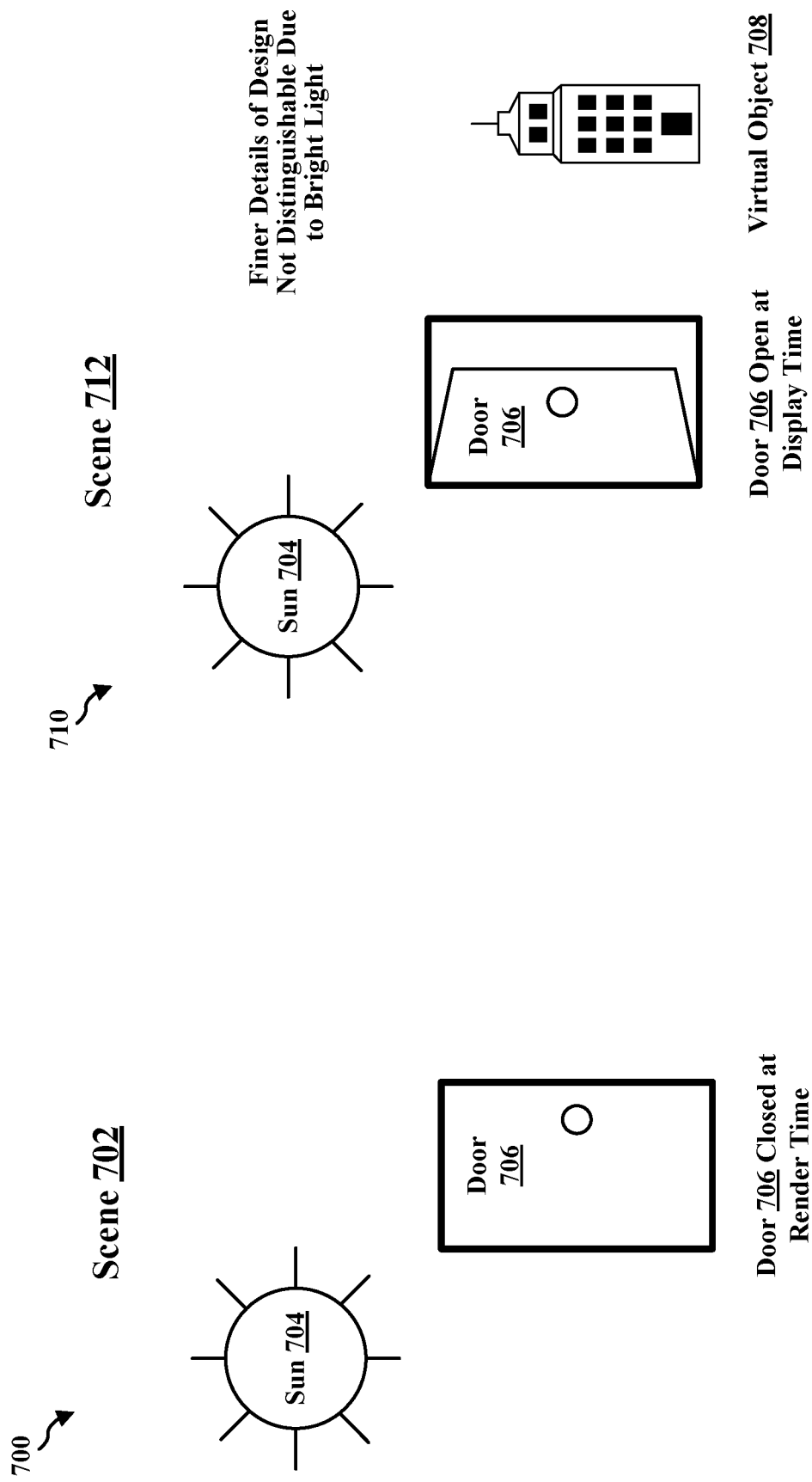
FIG. 7 is a diagram illustrating example scenes associated with display processing or graphics processing.

FIG. 7 is a diagram 700 and diagram 710, respectively, illustrating example scenes associated with display processing and/or graphics processing. More specifically, FIG. 7 depicts example scene 702 in diagram 700 and example scene 712 in diagram 710. Each of these scenes include several similar objects. For example, scene 702 includes sun 704 and door 706, while scene 712 includes sun 704, door 706, and virtual object 708. As shown in FIG. 7, diagram 700 depicts scene 702 including a sun 704, where door 706 is closed at render time. Further, diagram 710 depicts scene 712 including sun 704, door 706, and virtual object 708, where door 706 is open at display time. In diagram 710, the finer details of the design may not be distinguishable due to a bright light from sun 704.

Figure 8:
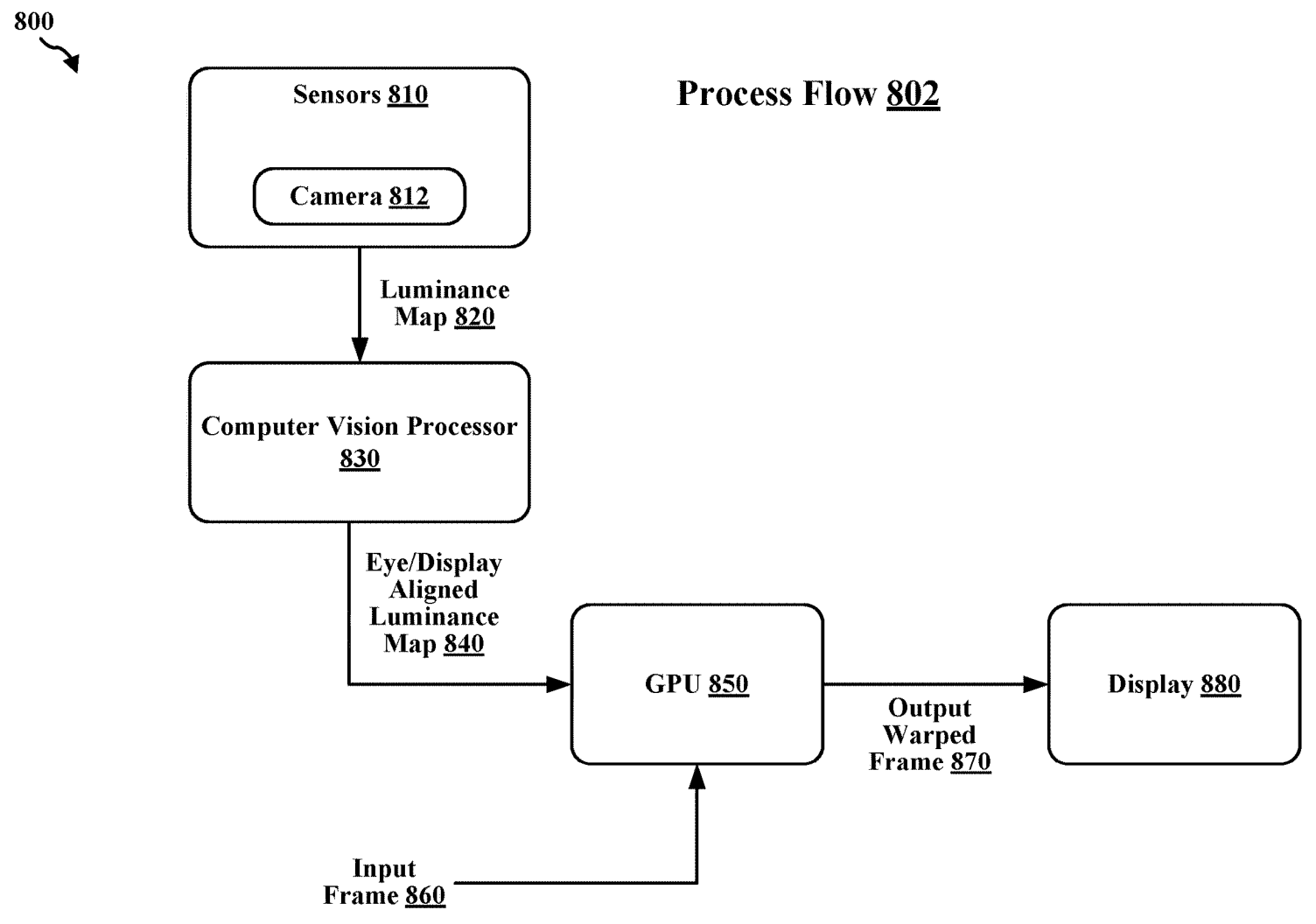

FIG. 8 is a diagram 800 illustrating an example processing flow. More specifically, FIG. 8 depicts a process flow 802 for the reprojection optimization processes according to aspects of the present disclosure. As shown in FIG. 8, diagram 800 includes sensors 810 including camera sensors 812, luminance map 820, computer vision processor 830, eye/display aligned luminance map 840, GPU 850, input frame 860, output warped frame 870, and display 880. As depicted in FIG. 8, the sensors 810 including camera sensors 812 may send luminance map 820 to the computer vision processor 830. Based on this, the computer vision processor 830 may configure or determine an eye/display aligned luminance map (e.g., eye/display aligned luminance map 840). After this, computer vision processor 830 may then send eye/display aligned luminance map 840 to GPU 850. The GPU 850 may likewise obtain the eye/display aligned luminance map 840 and at least one input frame (e.g., input frame 860) in order to produce an output warped frame (e.g., output warped frame). The GPU 850 may then send the output warped frame 870 to the display 880. In turn, the display 880 may display the output warped frame 870. The process flow 802 in diagram 800 depicts the reprojection optimization processes according to aspects presented herein.

Figure 9:
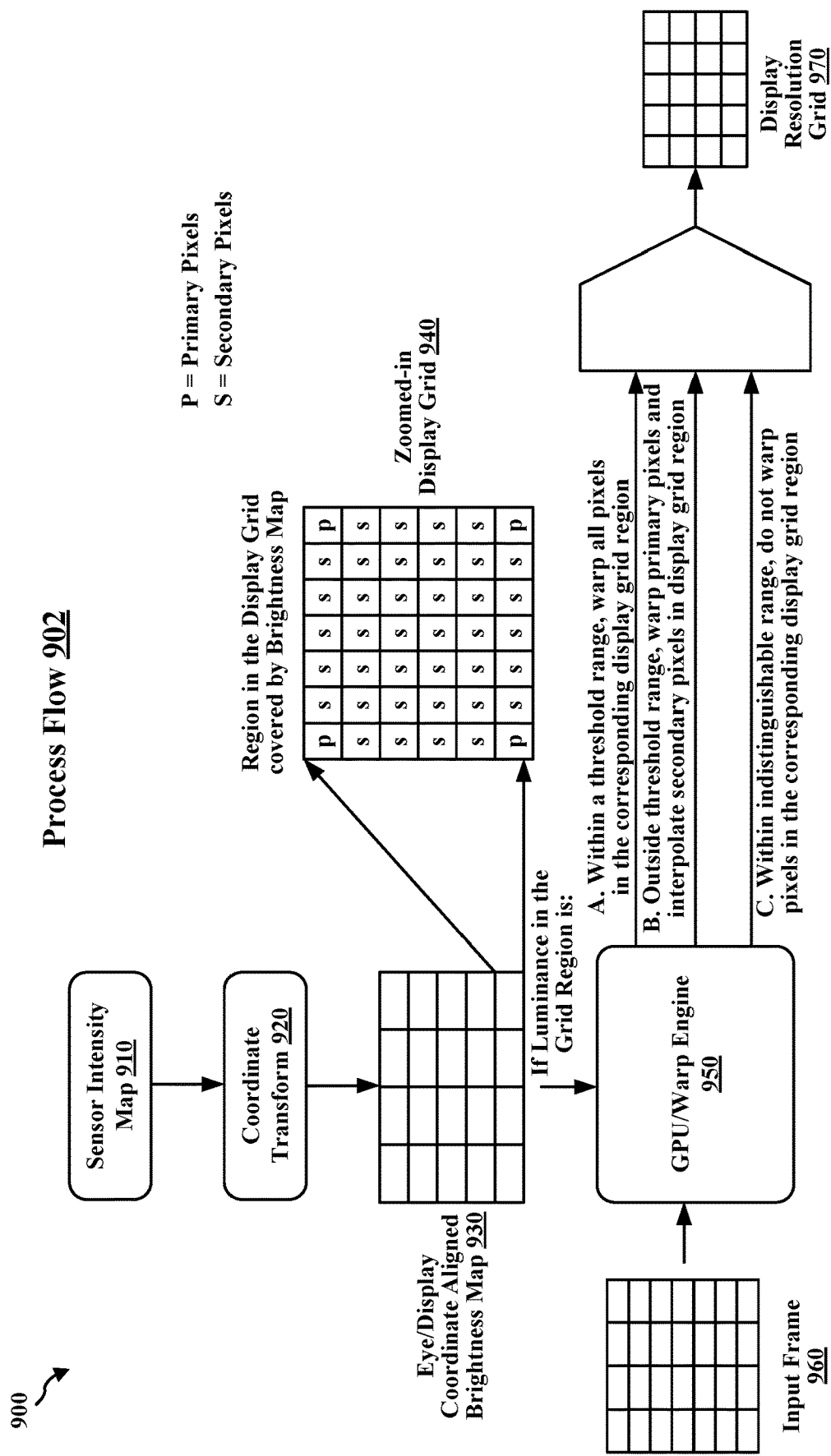
FIG. 9 is a diagram illustrating an example processing flow.

FIG. 9 is a diagram 900 illustrating another example processing flow. More specifically, FIG. 9 depicts a process flow 902 for the reprojection optimization processes according to aspects of the present disclosure. As shown in FIG. 9, diagram 900 includes a sensor intensity map 910, a coordinate transform process 920, an eye/display coordinate-aligned brightness map 930, a display grid 940, a GPU/warp engine 950, an input frame 960, and a display resolution grid 970. As depicted in FIG. 9, a sensor intensity map 910 may be sent to a coordinate transform process 920, which may result in an eye/display coordinate-aligned brightness map 930. The eye/display coordinate-aligned brightness map 930 may include different regions in a display grid that are covered by the eye/display coordinate-aligned brightness map 930. As shown in FIG. 9, a region (e.g., grid region) in display grid 940 covered by the brightness map (e.g., eye/display coordinate-aligned brightness map 930) may include different types of pixels (e.g., primary pixels (p) and secondary pixels (s)). In FIG. 9, the display grid 940 is shown in a zoomed-in view. The eye/display coordinate-aligned brightness map 930 and input frame 960 may be obtained by the GPU/warp engine 950. If the luminance in the grid region (e.g., region in display grid 940) is within a threshold range (e.g., a luminance threshold), the GPU/warp engine 950 may warp all of the pixels in the corresponding display grid region (e.g., region in display resolution grid 970). If the luminance in the grid region (e.g., region in display grid 940) is outside of a threshold range (e.g., a luminance threshold), the GPU/warp engine 950 may warp a subset of the pixels (e.g., the primary pixels) and/or interpolate other pixels (e.g., the secondary pixels) in display grid region (e.g., region in display resolution grid 970). If the luminance in the grid region (e.g., region in display grid 940) is in an indistinguishable range (e.g., less than a minimum luminance threshold and greater than a maximum luminance threshold), the GPU/warp engine 950 may refrain from warping (i.e., not warp) the pixels in the corresponding display grid region (e.g., region in display resolution grid 970). This warping process by the GPU/warp engine 950 may result in the display resolution grid 970.

Aspects presented herein may include a number of benefits or advantages. For instance, aspects presented herein may reduce the computational complexity of split rendering architectures in certain scenarios (e.g., when the brightness of the scene substantially changes compared to rendered time). By reducing the computational complexity of the split rendering architecture (e.g., when the brightness of the scene substantially changes compared to rendered time), aspects presented herein may reduce the bandwidth on memory or interconnect. Further, by reducing the computational complexity when the brightness of the scene changes (e.g., substantially changes) compared to rendered time, aspects presented herein may potentially allow for an overall reduction in power consumption. Accordingly, aspects presented herein may reduce the computational complexity at devices in split rendering architectures and/or reduce the overall power consumption at devices in split rendering architectures.

In some aspects, a certain layer in split rendering architecture may be used to display important information (e.g., a notification, etc.). For instance, a certain layer on the display devices (e.g., a head-locked layer) may display certain types of notifications or messages. Additionally, for a user of a display device in split rendering architectures, the light intensity of the display device may vary when the user is in certain types of environments (e.g., outdoor environments). Further, the light intensity of the display device may vary when the user is in indoor environments where lighting may frequently change (e.g., an environment with a light turning off and then on, repeatedly). In such cases with varying light intensity, it may be beneficial to automatically deal with the varying light intensity, so the user may view display devices more easily. For instance, it may be beneficial to establish a method to automatically estimate transformation parameters of a display device and provide this information.

Aspects of the present disclosure allow users of display devices to view the devices more easily during certain lighting environments (e.g., bright environments or environments with varying light intensity). For instance, aspects presented herein may provide a method to automatically estimate the transformation parameters of a display device and provide this information (e.g., send this information to an application). That is, aspects presented herein may utilize a spatial content reprojection based on light intensity. For instance, aspects presented herein may utilize an application that can decide to send certain parameters (e.g., transformation parameters) to a GPU or warp engine. Aspects presented herein may also filter the parameters (e.g., transformation parameters) and/or avoid enabling the transformation. Aspects presented herein may apply this process to a number of different layers for a split rendering architecture. For example, while this method may be applied to different layers, aspects presented herein may utilize head-locked content for the split rendering architecture.

Aspects presented herein may obtain an intensity map (e.g., intensity map r1) from certain types of sensors (e.g., camera sensors). The intensity map may be transformed based on eye/display co-ordinate frames in order to generate an updated intensity map (e.g., intensity map e1). The updated intensity map (e.g., intensity map e1) may be compared against an application threshold and/or a user-defined threshold. This threshold comparison may lead to distributed regions/blobs that are spread across the map (e.g., the intensity map). Moreover, aspects presented herein may traverse the map (e.g., the intensity map) to filter out the largest area that is visually conducive to display content. Aspects presented herein may also determine or calculate a grid aligned box that may encapsulate the region/blob. Further, aspects presented herein may calculate (i.e., solve for) certain types of parameters (e.g., scale and translation parameters). In some instances, aspects presented herein may estimate additional parameters using different types of methods, such as homography. Also, aspects presented herein may send/pass the calculated/estimated parameters from the aforementioned step to an application engine.

Additionally, the application engine may make a number of determinations or calculations. For instance, the application engine may determine whether to move content to a more visually optimal portion of the display. Likewise, the application engine may decide to not move the content to a more visually optimal portion of the display. Also, if certain updates are occurring frequently or an amount of transformation is large (e.g., greater than a threshold), the application engine may adjust for (i.e., smooth out) the changes. The application engine may then send the new parameters to a warp engine. In turn, the GPU/warp engine may warp the content (e.g., head-locked content) according to the parameters received from application engine and/or generate certain data (e.g., final frame data). This data may then be sent to the display engine. Further, in some instances, aspects presented herein may send the information (e.g., encapsulated blob information) to the application engine. In turn, the application engine may determine whether to proceed to the next steps (e.g., calculating or solving for the aforementioned parameters as mentioned in the aforementioned steps).

Figure 10:
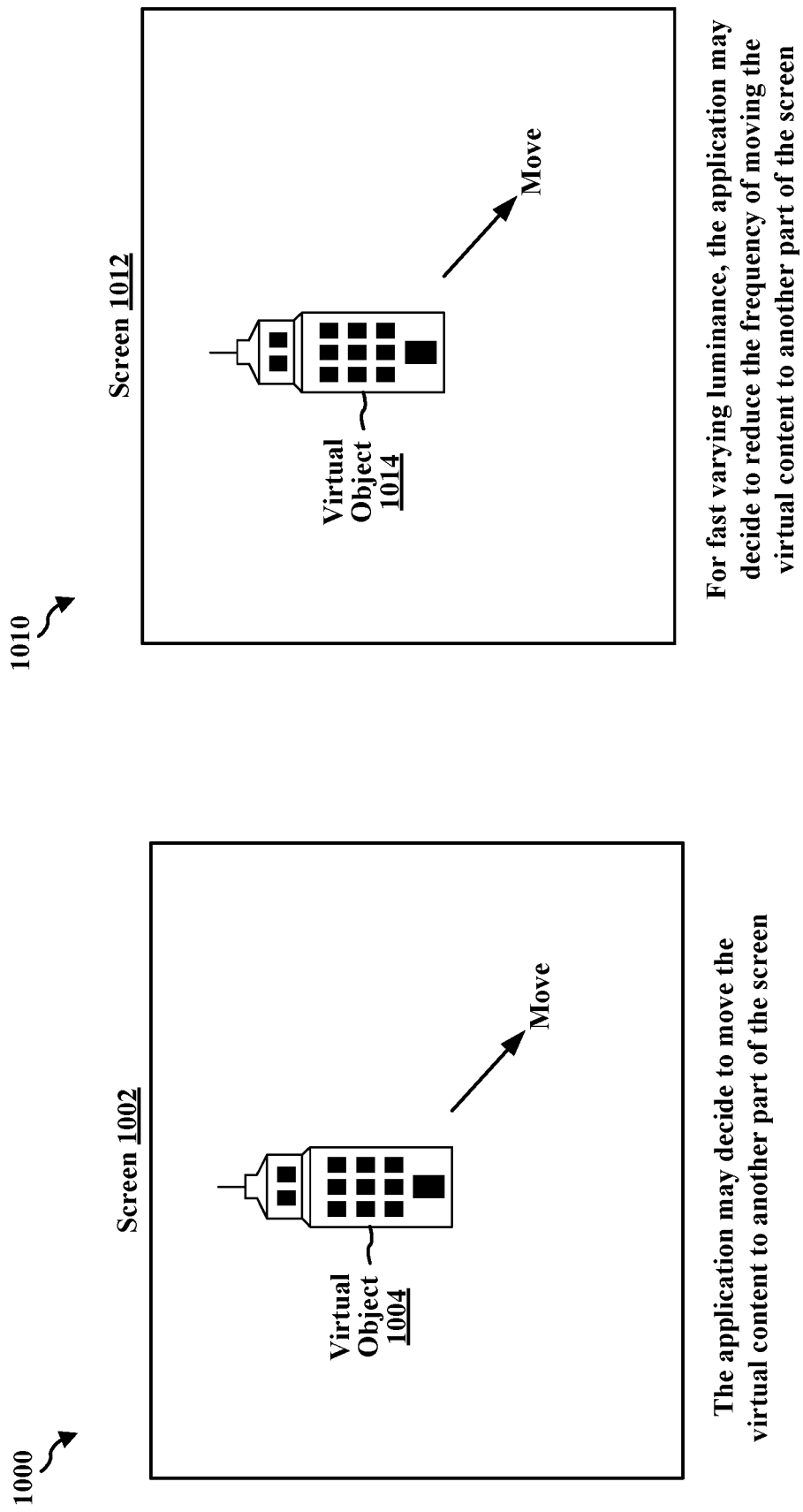
FIG. 10 is a diagram illustrating example scenes associated with display processing or graphics processing.

FIG. 10 is a diagram 1000 and diagram 1010, respectively, illustrating example scenes associated with display processing and/or graphics processing. More specifically, FIG. 10 depicts example scene on screen 1002 in diagram 1000 and example scene on screen 1012 in diagram 1010. Each of the scenes in diagram 1000 and diagram 1010 depict example scenes of application decisions. Diagram 1000 includes screen 1002 that displays virtual object 1004. Likewise, diagram 1010 includes screen 1012 that displays virtual object 1014. As shown in FIG. 10, diagram 1000 depicts a scene where an application may decide to move the virtual content (e.g., virtual object 1004) to another portion of the screen 1002. Further, diagram 1010 depicts scene with varying luminance (e.g., fast-varying luminance), where an application may decide to reduce the frequency of moving the virtual content (e.g., virtual object 1014) to another part of the screen 1012. By reduce the frequency of moving virtual content (e.g., virtual object 1014) to another part of the screen (e.g., screen 1012), aspects presented herein may reduce the amount of computations and/or power consumption at a display device.

Figure 11:
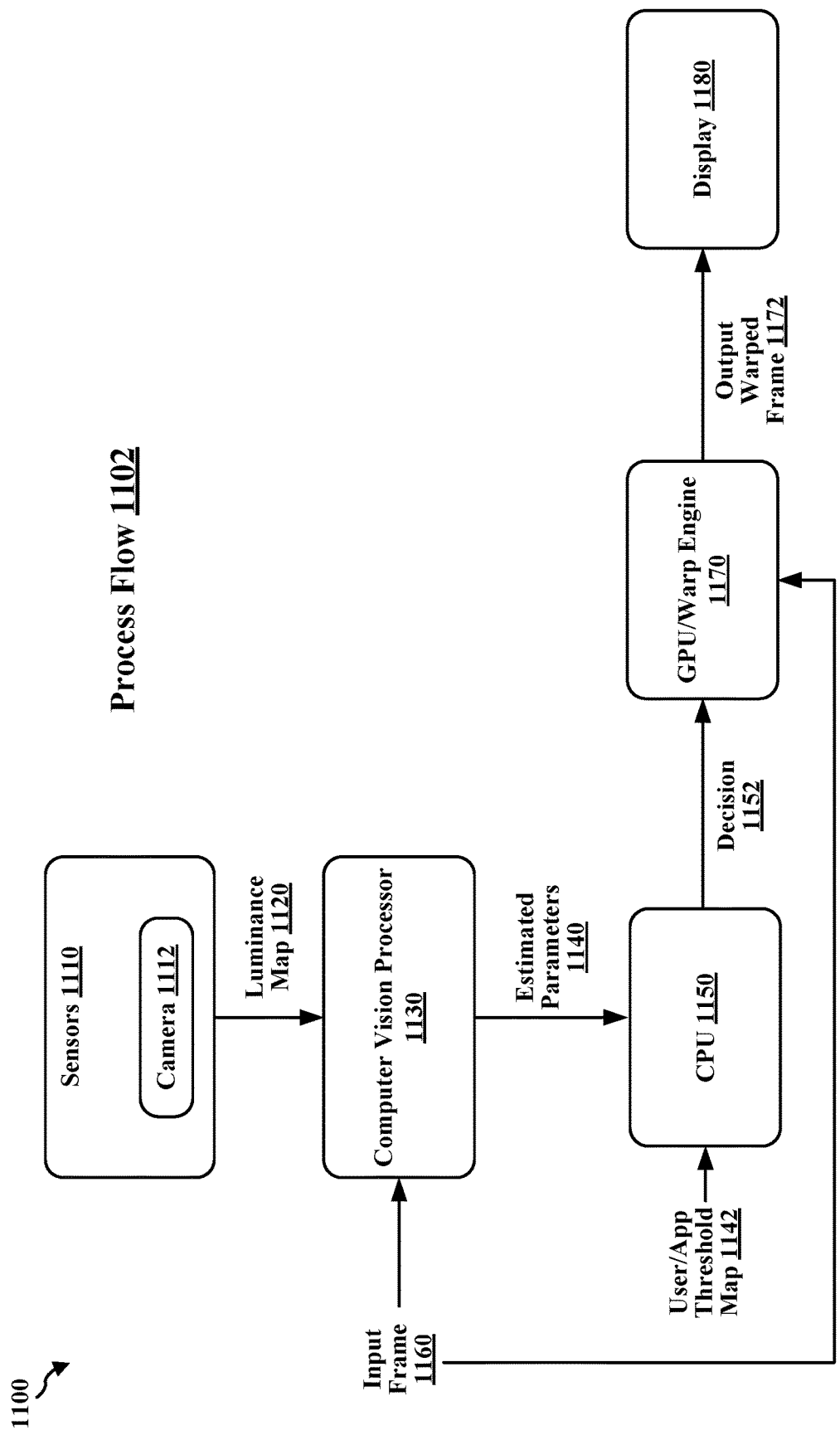
FIG. 11 is a diagram illustrating an example processing flow.

FIG. 11 is a diagram 1100 illustrating an example processing flow. More specifically, FIG. 11 depicts process flow 1102 (e.g., a high-level process flow) for the spatial content reprojection according to aspects of the present disclosure. As shown in FIG. 11, diagram 1100 includes sensors 1110 including camera sensors 1112, luminance map 1120, computer vision processor 1130, estimated parameters 1140, user/application threshold map 1142, CPU 1150, decision 1152, input frame 1160, GPU or warp engine 1170, output warped frame 1172, and display 1180. As depicted in FIG. 11, the sensors 1110 including camera sensors 1112 may send luminance map 1120 to the computer vision processor 1130. The computer vision processor 1130 may also receive an input frame 1160. Based on this, the computer vision processor 1130 may determine or estimate parameters (e.g., estimated parameters 1140). Also, the computer vision processor 1130 may send estimated parameters 1140 to CPU 1150. The CPU 1150 may also receive a user/application threshold map 1142. Based on this, the CPU 1150 may make a decision 1152 and then transmit an indication of the decision 1152 to the GPU/warp engine 1170. GPU/warp engine 1170 may also receive input frame 1160. Based on this, the GPU/warp engine 1170 may configure output warped frame 1172 and then transmit output warped frame 1172 to the display 1180. Next, the display 1180 may display the output warped frame 1172. The process flow 1102 in diagram 1100 depicts the spatial content reprojection processes according to aspects presented herein.

Figure 12:
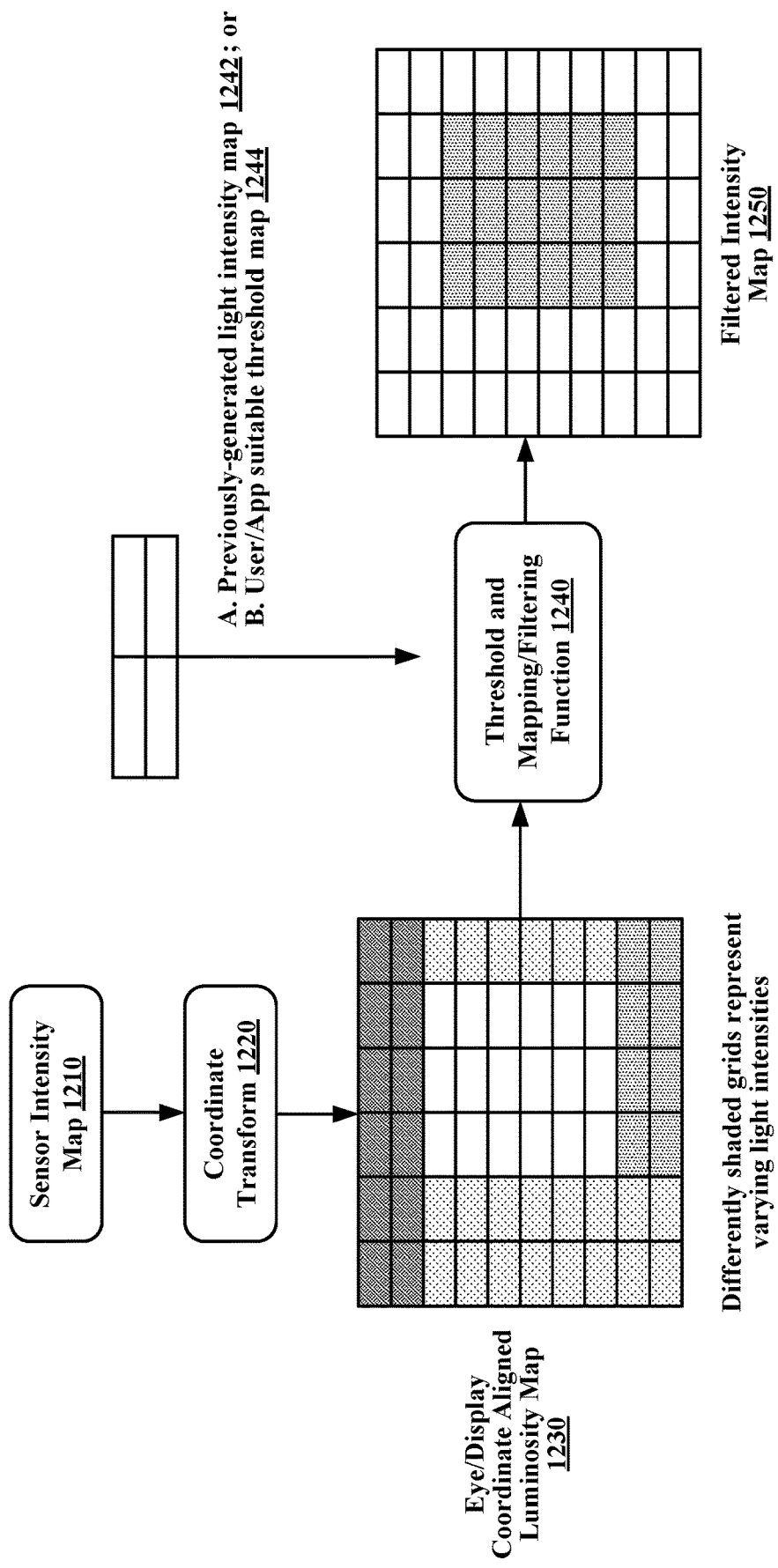
FIG. 12 is a diagram illustrating an example processing flow.

FIG. 12 is a diagram 1200 illustrating an example processing flow. More specifically, FIG. 12 depicts a process flow 1202 for the spatial content reprojection according to aspects of the present disclosure. As shown in FIG. 12, diagram 1200 includes a sensor intensity map 1210 (e.g., a camera sensor intensity map), a coordinate transform step 1220 (e.g., a step to transform coordinates), an eye/display coordinate-aligned luminosity map 1230, a threshold and mapping/filtering function 1240, and a filtered intensity map 1250. FIG. 12 also shows a previously-generated light intensity map 1242 and a user/application suitable threshold map 1244. As depicted in FIG. 12, the sensor intensity map 1210 may be sent to the coordinate transform step 1220, which may then be sent to the eye/display coordinate-aligned luminosity map 1230. FIG. 12 illustrates that the eye/display coordinate-aligned luminosity map 1230 may include varying light intensities, which are represented my different shaded grids (e.g., grids without shading, grids with like shading, grids with medium shading, and grids with heavy shading). The result of eye/display coordinate-aligned luminosity map 1230 may be communicated to the threshold and mapping/filtering function 1240. The output of the threshold and mapping/filtering function 1240 may be the filtered intensity map 1250. In some aspects, the threshold and mapping/filtering function 1240 may receive a previously-generated light intensity map 1242 and/or a user/application suitable threshold map 1244. In turn, this may be used to create the filtered intensity map 1250.

Figure 13:
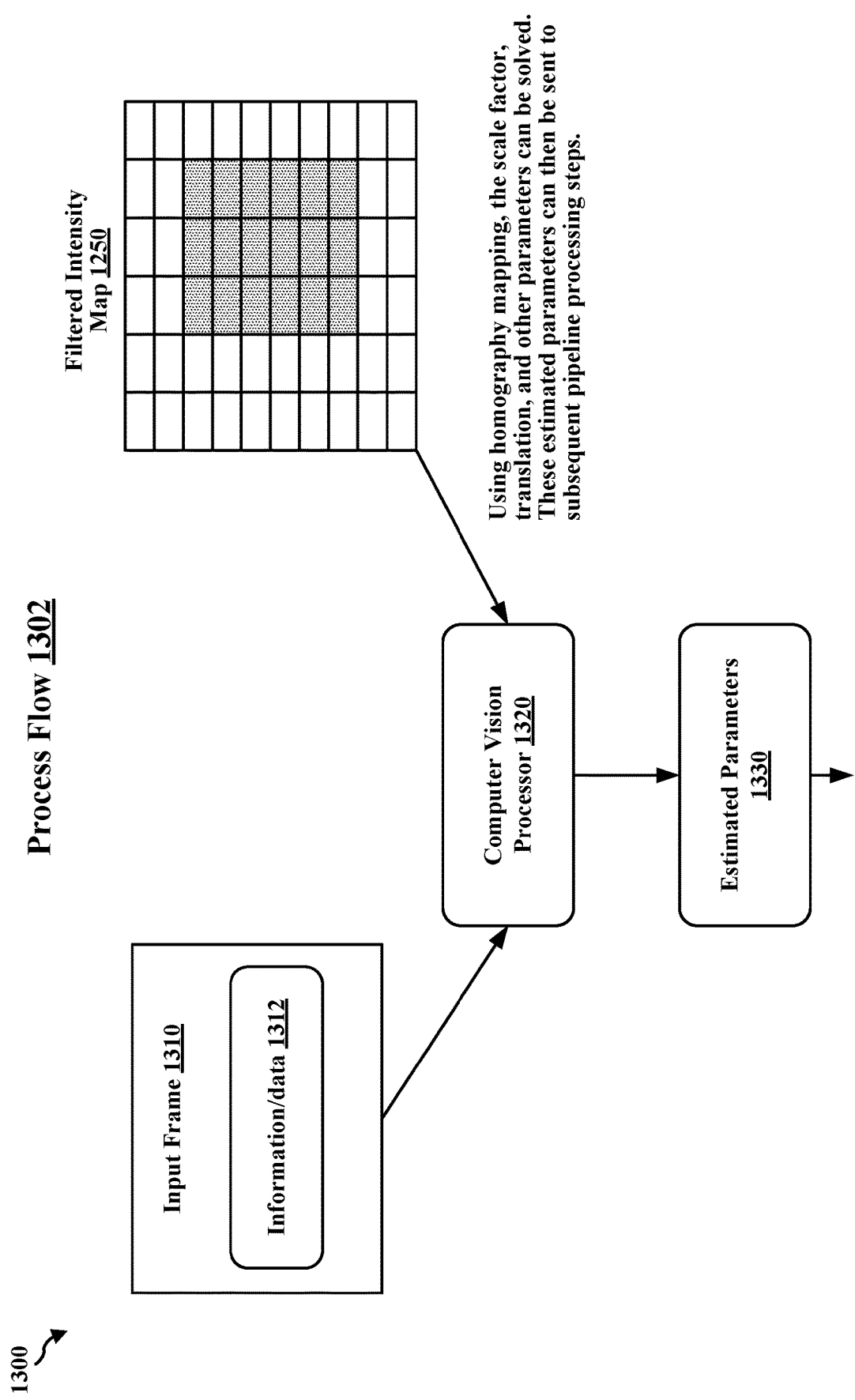
FIG. 13 is a diagram illustrating an example processing flow.

FIG. 13 is a diagram 1300 illustrating an example processing flow. More specifically, FIG. 13 depicts a process flow 1302 for the spatial content reprojection according to aspects of the present disclosure, which may be a continuation of the process flow 1202 shown in FIG. 12. As shown in FIG. 13, diagram 1300 includes an input frame 1310 including information/data 1312, a filtered intensity map 1250 (e.g., the filtered intensity map 1250 from FIG. 12), a computer vision processor 1320, and estimated parameters 1330. As depicted in FIG. 13, the input frame 1310 (with the information/data 1312) and the filtered intensity map 1250 (e.g., the filtered intensity map 1250 from the previous step in diagram 1200) may be sent to the computer vision processor 1320. In some instances, using homography mapping, computer vision processor 1320 may estimate or solve for a number of different parameters (e.g., the scale factor, translation parameters, and/or other parameters). As shown in FIG. 13, this estimation or calculation from computer vision processor 1320 may result in estimated parameters 1330. As further shown in FIG. 13, these estimated parameters 1330 may then be sent to a subsequent pipeline processing step.

Figure 14:
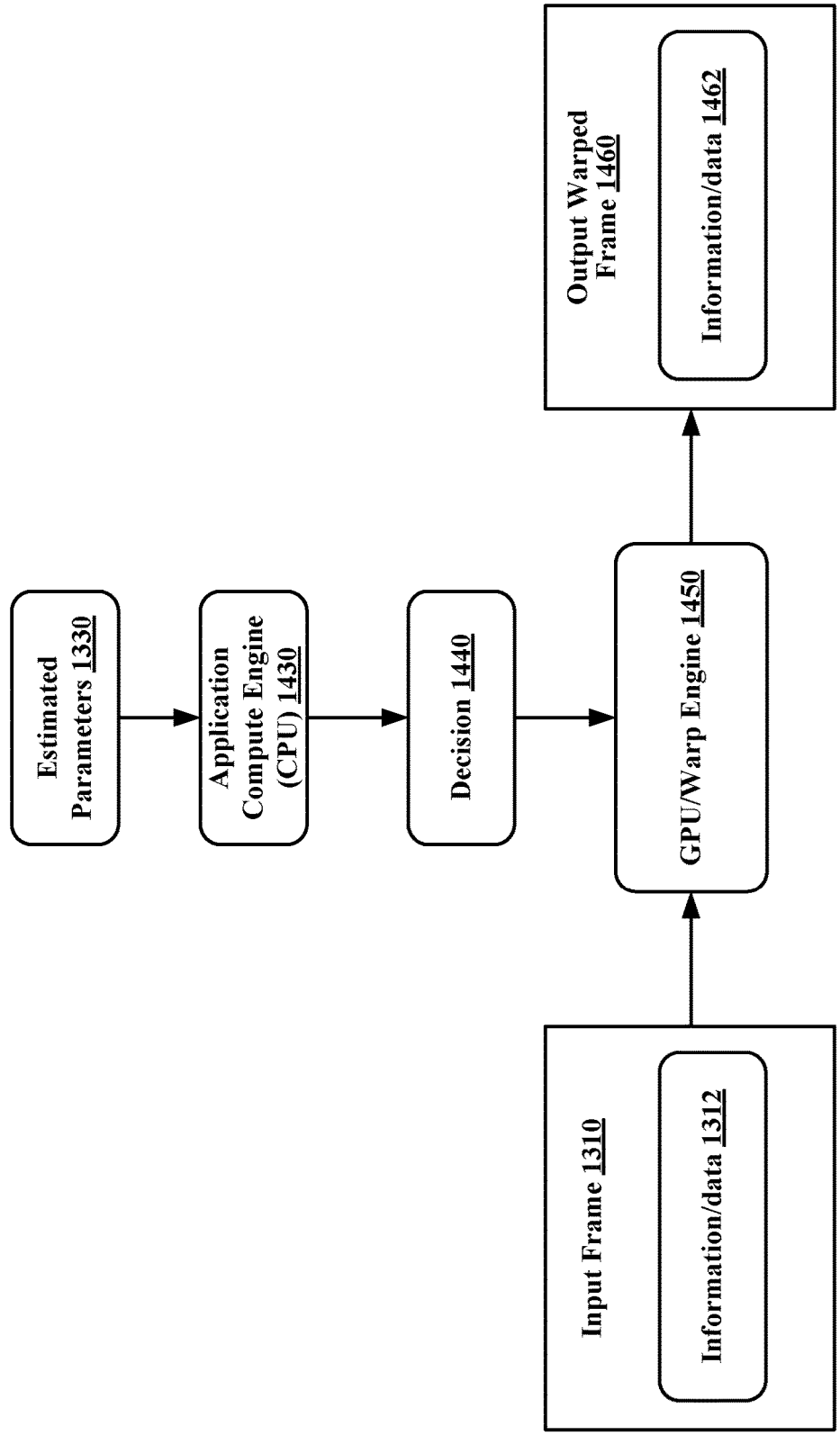
FIG. 14 is a diagram illustrating an example processing flow.

FIG. 14 is a diagram 1400 illustrating an example processing flow. More specifically, FIG. 14 depicts a process flow 1402 for the spatial content reprojection according to aspects of the present disclosure, which may be a continuation of the process flow 1302 shown in FIG. 13. As shown in FIG. 14, diagram 1400 includes input frame 1310 including information/data 1312 (e.g., the input frame 1310 including information/data 1312 from FIG. 13), estimated parameters 1330 (e.g., the estimated parameters 1330 from FIG. 13), application compute engine 1430 (e.g., a CPU), a decision step 1440, GPU/warp engine 1450, and output warped frame 1460 including information/data 1462. As depicted in FIG. 14, certain parameters (e.g., the estimated parameters 1330 from the previous step in diagram 1300) may be sent to the application compute engine 1430 (e.g., CPU). Based on the estimated parameters 1330, the application compute engine 1430 (e.g., CPU) may make a decision at the decision step 1440. This decision from decision step 1440 (e.g., a 'yes' decision or a 'no' decision) may be sent to the GPU/warp engine 1450, along with the input frame 1310 including information/data 1312 (e.g., the input frame 1310 including information/data 1312 from the previous step in diagram 1300). Based on this, the GPU/warp engine 1450 may configure the output warped frame 1460 including information/data 1462. GPU/warp engine 1450 may then transmit the output warped frame 1460 including the information/data 1462. For example, GPU/warp engine 1450 may send the output warped frame 1460 including the information/data 1462 to a display.

Aspects presented herein may include a number of benefits or advantages. For instance, aspects of the present disclosure allow users of display devices to view the devices more easily during certain lighting environments (e.g., bright environments or environments with varying light intensity). Aspects presented herein may provide a method to automatically estimate the transformation parameters of a display device and provide this information (e.g., send this information to an application). Indeed, aspects presented herein may utilize a spatial content reprojection based on light intensity. For example, aspects presented herein may utilize an application that can decide to send certain parameters (e.g., transformation parameters) to a GPU or warp engine. Additionally, aspects presented herein may also filter the parameters (e.g., transformation parameters) and/or avoid enabling the transformation. Aspects presented herein may apply this process to a number of different layers for a split rendering architecture. For instance, while this method may be applied to different layers, aspects presented herein may utilize head-locked content for the split rendering architecture.

Figure 15:
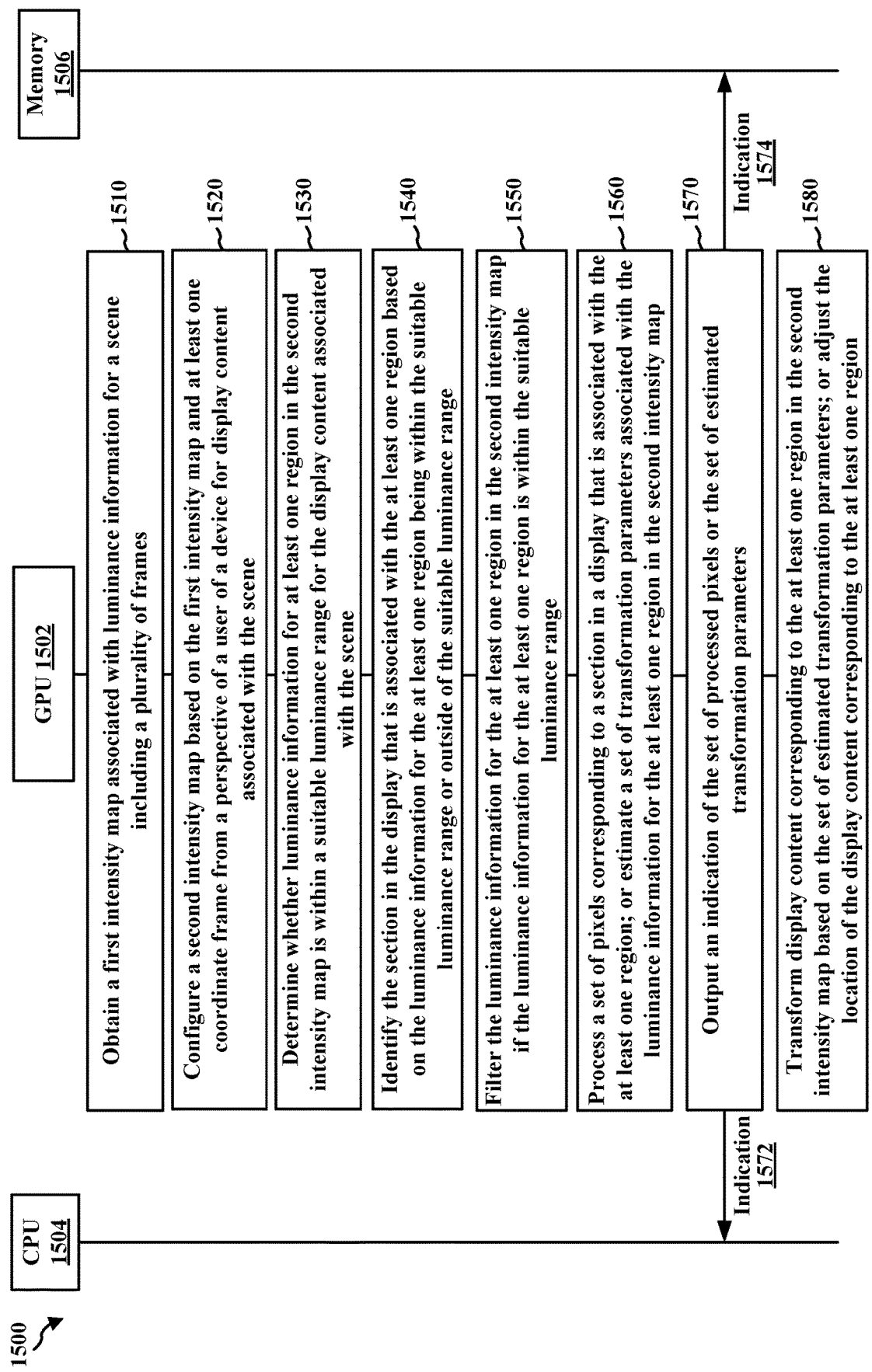
FIG. 15 is a communication flow diagram illustrating example communications between a GPU, a CPU, and a memory.

FIG. 15 is a communication flow diagram 1500 of data processing or graphics processing in accordance with one or more techniques of this disclosure. As shown in FIG. 15, diagram 1500 includes example communications between GPU 1502 (e.g., a GPU, a cache at a GPU, a GPU component, another graphics processor, a CPU, a CPU component, or another central processor), CPU 1504 (e.g., a CPU, a cache at a CPU, a CPU component, another central processor, a GPU, a GPU component, or another graphics processor), and memory 1506 (e.g., a system memory, a graphics memory, or a memory or cache at a GPU), in accordance with one or more techniques of this disclosure.

At 1510, GPU 1502 may obtain a first intensity map associated with luminance information for a scene including a plurality of frames, where the first intensity map corresponds to a camera associated with the scene. In some aspects, obtaining the first intensity map may comprise obtaining the first intensity map from a set of camera sensors for the camera associated with the scene.

At 1520, GPU 1502 may configure a second intensity map based on the first intensity map and at least one coordinate frame from a perspective of a user of a device for display content associated with the scene, where the second intensity map is associated with the luminance information for the scene. In some aspects, configuring the second intensity map may comprise transforming the first intensity map to generate the second intensity map based on the first intensity map and the at least one coordinate frame from the perspective of the user of the device for the display content associated with the scene.

At 1530, GPU 1502 may determine whether luminance information for at least one region in the second intensity map is within a suitable luminance range for the display content associated with the scene. The suitable luminance range may be greater than a minimum luminance threshold and less than a maximum luminance threshold. Also, at least one of the minimum luminance threshold or the maximum luminance threshold may be an application-defined threshold or a user-defined threshold. In some aspects, determining whether the luminance information for the at least one region in the second intensity map is within the suitable luminance range may comprise transmitting a first indication of the luminance information for the at least one region; and receiving a second indication of whether the luminance information for the at least one region in the second intensity map is within the suitable luminance range for the display content. Also, receiving the second indication may comprise receiving the second indication from a graphics processing unit (GPU) or an application engine at a central processing unit (CPU).

At 1540, GPU 1502 may identify the section in the display that is associated with the at least one region based on the luminance information for the at least one region being within the suitable luminance range or outside of the suitable luminance range, and where processing the set of pixels comprises process the set of pixels based on the identification of the section in the display.

At 1550, GPU 1502 may filter the luminance information for the at least one region in the second intensity map if the luminance information for the at least one region is within the suitable luminance range. In some aspects, if the luminance information for the at least one region is within the suitable luminance range, the luminance information for the at least one region may be visually conducive to the display content associated with the scene. Also, if the luminance information for the at least one region is within the suitable luminance range, a grid-aligned section in the second intensity map may be associated with the at least one region.

At 1560, GPU 1502 may process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range. In some aspects, processing the set of pixels corresponding to the section in the display may comprise transforming all of the set of pixels corresponding to the section in the display based on the luminance information for the at least one region being within the suitable luminance range. Also, the GPU (e.g., GPU 1502) may transmit, to the display, the transformed set of pixels corresponding to the section in the display. In some instances, transforming the set of pixels corresponding to the section in the display may comprise warping the set of pixels corresponding to the section in the display. Also, an amount of the transformed set of pixels may be associated with at least one of: head movement of the user of the device for the display content, body movement of the user of the device, or a surrounding environment of the user of the device. In some aspects, processing the set of pixels corresponding to the section in the display may comprise transforming a subset of pixels in the set of pixels corresponding to the section in the display based on the luminance information for the at least one region being outside of the suitable luminance range. Also, the GPU (e.g., GPU 1502) may transmit, to the display, the transformed subset of pixels corresponding to the section in the display. In some instances, the GPU (e.g., GPU 1502) may estimate a color value of a remaining amount of the set of pixels, where the remaining amount of the set of pixels is equal to an amount of the set of pixels that does not include the subset of pixels, where the estimated color value of the remaining amount of the set of pixels is interpolated based on the subset of pixels. Also, transforming the subset of pixels corresponding to the section in the display may comprise warping the subset of pixels corresponding to the section in the display. Further, an amount of the transformed subset of pixels may be associated with at least one of: head movement of the user of the device for the display content, body movement of the user of the device, or a surrounding environment of the user of the device. In some aspects, processing the set of pixels corresponding to the section in the display may comprise refraining from transforming a subset of pixels in the set of pixels corresponding to the section in the display based on the luminance information for the at least one region being outside of the suitable luminance range and being within the indistinguishable luminance range, where the indistinguishable luminance range is less than a minimum luminance threshold and greater than a maximum luminance threshold, and where the indistinguishable luminance range corresponds to a time for the user to distinguish the display content that is greater than a distinguishable time threshold.

At 1570, GPU 1502 may output an indication of the set of processed pixels or the set of estimated transformation parameters. In some aspects, outputting the indication of the set of processed pixels or the set of estimated transformation parameters may comprise transmitting, to at least one of: a warp engine or an application engine at a central processing unit (CPU), the indication of the set of processed pixels or the set of estimated transformation parameters. For example, GPU 1502 may transmit indication 1572 to CPU 1504. Also, outputting the indication of the set of processed pixels or the set of estimated transformation parameters may comprise storing, in a first memory or a cache, the indication of the set of processed pixels or the set of estimated transformation parameters. For example, GPU 1502 may store indication 1574 in memory 1506. Additionally, the set of transformation parameters may include at least one of: a set of scaling parameters or a set of translation parameters.

At 1580, GPU 1502 may transform display content corresponding to the at least one region in the second intensity map based on the set of estimated transformation parameters. In some aspects, after the transformation, the GPU (e.g., GPU 1502) may transmit the transformed display content corresponding to the at least one region in the second intensity map.

Also, at 1580, GPU 1502 may adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold. In some aspects, the GPU (e.g., GPU 1502) may estimate a set of updated transformation parameters associated with the luminance information for the at least one region based on the adjusted location of the display content corresponding to the at least one region. The GPU (e.g., GPU 1502) may also output the set of estimated updated transformation parameters associated with the luminance information for the at least one region.

Figure 16:
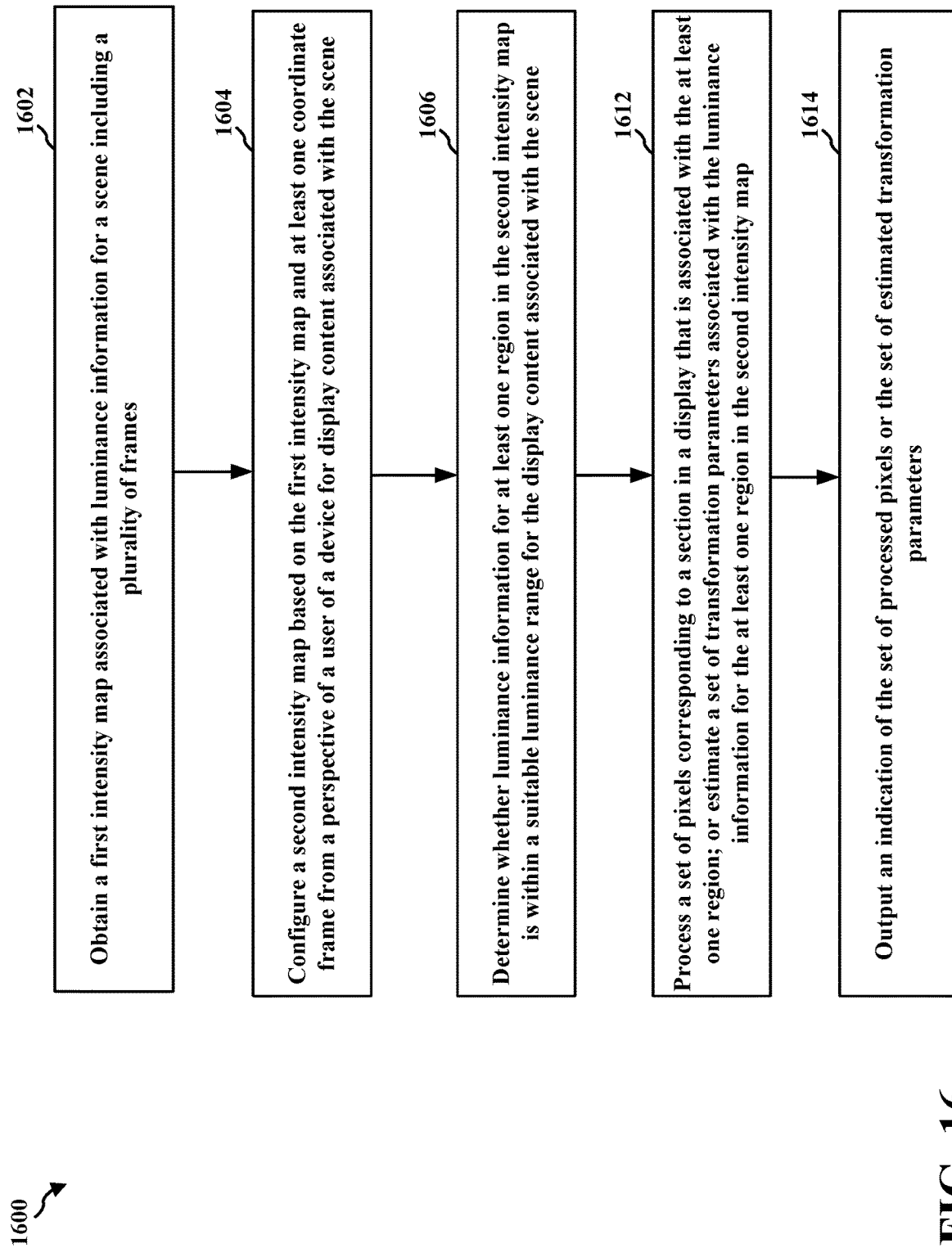
FIG. 16 is a flowchart of an example method of display processing.

FIG. 16 is a flowchart 1600 of an example method of data processing or graphics processing in accordance with one or more techniques of this disclosure. The method may be performed by a GPU (e.g., a GPU, a cache at a GPU, a GPU component, another graphics processor, a CPU, a CPU component, or another central processor), a CPU (e.g., a CPU, a cache at a CPU, a CPU component, another central processor, a GPU, a GPU component, or another graphics processor), a display driver integrated circuit (DDIC), an apparatus for data or graphics processing, a wireless communication device, and/or any apparatus that may perform data or graphics processing as used in connection with the examples of FIGS. 1-15.

At 1602, the GPU may obtain a first intensity map associated with luminance information for a scene including a plurality of frames, where the first intensity map corresponds to a camera associated with the scene, as described in connection with the examples in FIGS. 1-15. For example, as described in 1510 of FIG. 15, GPU 1502 may obtain a first intensity map associated with luminance information for a scene including a plurality of frames, where the first intensity map corresponds to a camera associated with the scene. Further, step 1602 may be performed by processing unit 120 in FIG. 1. In some aspects, obtaining the first intensity map may comprise obtaining the first intensity map from a set of camera sensors for the camera associated with the scene.

At 1604, the GPU may configure a second intensity map based on the first intensity map and at least one coordinate frame from a perspective of a user of a device for display content associated with the scene, where the second intensity map is associated with the luminance information for the scene, as described in connection with the examples in FIGS. 1-15. For example, as described in 1520 of FIG. 15, GPU 1502 may configure a second intensity map based on the first intensity map and at least one coordinate frame from a perspective of a user of a device for display content associated with the scene, where the second intensity map is associated with the luminance information for the scene. Further, step 1604 may be performed by processing unit 120 in FIG. 1. In some aspects, configuring the second intensity map may comprise transforming the first intensity map to generate the second intensity map based on the first intensity map and the at least one coordinate frame from the perspective of the user of the device for the display content associated with the scene.

At 1606, the GPU may determine whether luminance information for at least one region in the second intensity map is within a suitable luminance range for the display content associated with the scene, as described in connection with the examples in FIGS. 1-15. For example, as described in 1530 of FIG. 15, GPU 1502 may determine whether luminance information for at least one region in the second intensity map is within a suitable luminance range for the display content associated with the scene. Further, step 1606 may be performed by processing unit 120 in FIG. 1. The suitable luminance range may be greater than a minimum luminance threshold and less than a maximum luminance threshold. Also, at least one of the minimum luminance threshold or the maximum luminance threshold may be an application-defined threshold or a user-defined threshold. In some aspects, determining whether the luminance information for the at least one region in the second intensity map is within the suitable luminance range may comprise transmitting a first indication of the luminance information for the at least one region; and receiving a second indication of whether the luminance information for the at least one region in the second intensity map is within the suitable luminance range for the display content. Also, receiving the second indication may comprise receiving the second indication from a graphics processing unit (GPU) or an application engine at a central processing unit (CPU).

At 1612, the GPU may process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range, as described in connection with the examples in FIGS. 1-15. For example, as described in 1560 of FIG. 15, GPU 1502 may process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range. Further, step 1612 may be performed by processing unit 120 in FIG. 1. In some aspects, processing the set of pixels corresponding to the section in the display may comprise transforming all of the set of pixels corresponding to the section in the display based on the luminance information for the at least one region being within the suitable luminance range. Also, the GPU (e.g., GPU 1502) may transmit, to the display, the transformed set of pixels corresponding to the section in the display. In some instances, transforming the set of pixels corresponding to the section in the display may comprise warping the set of pixels corresponding to the section in the display. Also, an amount of the transformed set of pixels may be associated with at least one of: head movement of the user of the device for the display content, body movement of the user of the device, or a surrounding environment of the user of the device. In some aspects, processing the set of pixels corresponding to the section in the display may comprise transforming a subset of pixels in the set of pixels corresponding to the section in the display based on the luminance information for the at least one region being outside of the suitable luminance range. Also, the GPU (e.g., GPU 1502) may transmit, to the display, the transformed subset of pixels corresponding to the section in the display. In some instances, the GPU (e.g., GPU 1502) may estimate a color value of a remaining amount of the set of pixels, where the remaining amount of the set of pixels is equal to an amount of the set of pixels that does not include the subset of pixels, where the estimated color value of the remaining amount of the set of pixels is interpolated based on the subset of pixels. Also, transforming the subset of pixels corresponding to the section in the display may comprise warping the subset of pixels corresponding to the section in the display. Further, an amount of the transformed subset of pixels may be associated with at least one of: head movement of the user of the device for the display content, body movement of the user of the device, or a surrounding environment of the user of the device. In some aspects, processing the set of pixels corresponding to the section in the display may comprise refraining from transforming a subset of pixels in the set of pixels corresponding to the section in the display based on the luminance information for the at least one region being outside of the suitable luminance range and being within the indistinguishable luminance range, where the indistinguishable luminance range is less than a minimum luminance threshold and greater than a maximum luminance threshold, and where the indistinguishable luminance range corresponds to a time for the user to distinguish the display content that is greater than a distinguishable time threshold.

At 1614, the GPU may output an indication of the set of processed pixels or the set of estimated transformation parameters, as described in connection with the examples in FIGS. 1-15. For example, as described in 1570 of FIG. 15, GPU 1502 may output an indication of the set of processed pixels or the set of estimated transformation parameters. Further, step 1614 may be performed by processing unit 120 in FIG. 1. In some aspects, outputting the indication of the set of processed pixels or the set of estimated transformation parameters may comprise transmitting, to at least one of: a warp engine or an application engine at a central processing unit (CPU), the indication of the set of processed pixels or the set of estimated transformation parameters. For example, GPU 1502 may transmit indication 1572 to CPU 1504. Also, outputting the indication of the set of processed pixels or the set of estimated transformation parameters may comprise storing, in a first memory or a cache, the indication of the set of processed pixels or the set of estimated transformation parameters. For example, GPU 1502 may store indication 1574 in memory 1506. Additionally, the set of transformation parameters may include at least one of: a set of scaling parameters or a set of translation parameters.

Figure 17:
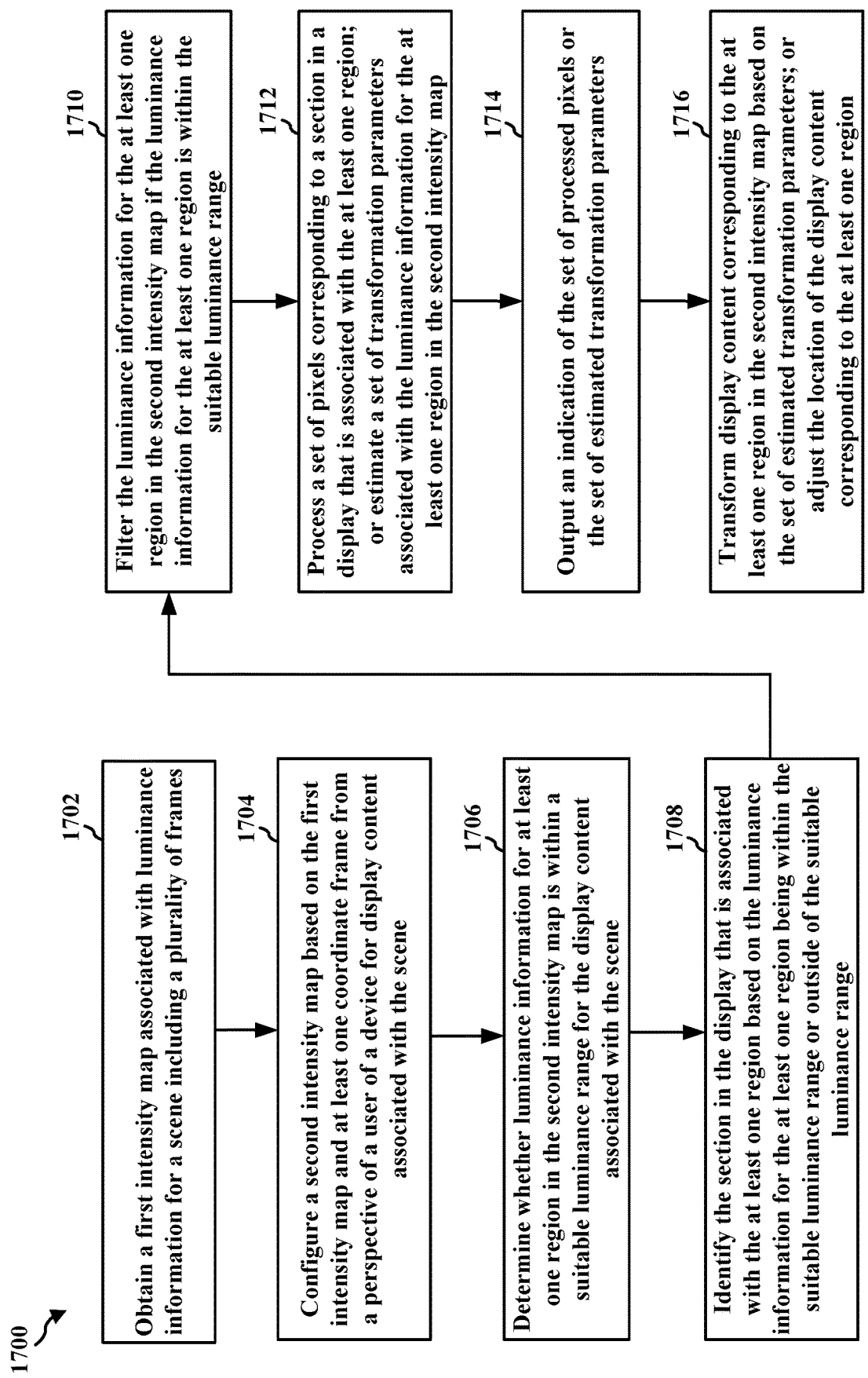
FIG. 17 is a flowchart of an example method of display processing.

FIG. 17 is a flowchart 1700 of an example method of data processing or graphics processing in accordance with one or more techniques of this disclosure. The method may be performed by a GPU (e.g., a GPU, a cache at a GPU, a GPU component, another graphics processor, a CPU, a CPU component, or another central processor), a CPU (e.g., a CPU, a cache at a CPU, a CPU component, another central processor, a GPU, a GPU component, or another graphics processor), a display driver integrated circuit (DDIC), an apparatus for data or graphics processing, a wireless communication device, and/or any apparatus that may perform data or graphics processing as used in connection with the examples of FIGS. 1-15.

At 1702, the GPU may obtain a first intensity map associated with luminance information for a scene including a plurality of frames, where the first intensity map corresponds to a camera associated with the scene, as described in connection with the examples in FIGS. 1-15. For example, as described in 1510 of FIG. 15, GPU 1502 may obtain a first intensity map associated with luminance information for a scene including a plurality of frames, where the first intensity map corresponds to a camera associated with the scene. Further, step 1702 may be performed by processing unit 120 in FIG. 1. In some aspects, obtaining the first intensity map may comprise obtaining the first intensity map from a set of camera sensors for the camera associated with the scene.

At 1704, the GPU may configure a second intensity map based on the first intensity map and at least one coordinate frame from a perspective of a user of a device for display content associated with the scene, where the second intensity map is associated with the luminance information for the scene, as described in connection with the examples in FIGS. 1-15. For example, as described in 1520 of FIG. 15, GPU 1502 may configure a second intensity map based on the first intensity map and at least one coordinate frame from a perspective of a user of a device for display content associated with the scene, where the second intensity map is associated with the luminance information for the scene. Further, step 1704 may be performed by processing unit 120 in FIG. 1. In some aspects, configuring the second intensity map may comprise transforming the first intensity map to generate the second intensity map based on the first intensity map and the at least one coordinate frame from the perspective of the user of the device for the display content associated with the scene.

At 1706, the GPU may determine whether luminance information for at least one region in the second intensity map is within a suitable luminance range for the display content associated with the scene, as described in connection with the examples in FIGS. 1-15. For example, as described in 1530 of FIG. 15, GPU 1502 may determine whether luminance information for at least one region in the second intensity map is within a suitable luminance range for the display content associated with the scene. Further, step 1706 may be performed by processing unit 120 in FIG. 1. The suitable luminance range may be greater than a minimum luminance threshold and less than a maximum luminance threshold. Also, at least one of the minimum luminance threshold or the maximum luminance threshold may be an application-defined threshold or a user-defined threshold. In some aspects, determining whether the luminance information for the at least one region in the second intensity map is within the suitable luminance range may comprise transmitting a first indication of the luminance information for the at least one region; and receiving a second indication of whether the luminance information for the at least one region in the second intensity map is within the suitable luminance range for the display content. Also, receiving the second indication may comprise receiving the second indication from a graphics processing unit (GPU) or an application engine at a central processing unit (CPU).

At 1708, the GPU may identify the section in the display that is associated with the at least one region based on the luminance information for the at least one region being within the suitable luminance range or outside of the suitable luminance range, and where processing the set of pixels may comprise process the set of pixels based on the identification of the section in the display, as described in connection with the examples in FIGS. 1-15. For example, as described in 1540 of FIG. 15, GPU 1502 may identify the section in the display that is associated with the at least one region based on the luminance information for the at least one region being within the suitable luminance range or outside of the suitable luminance range, and where processing the set of pixels may comprise process the set of pixels based on the identification of the section in the display. Further, step 1708 may be performed by processing unit 120 in FIG. 1.

At 1710, the GPU may filter the luminance information for the at least one region in the second intensity map if the luminance information for the at least one region is within the suitable luminance range, as described in connection with the examples in FIGS. 1-15. For example, as described in 1550 of FIG. 15, GPU 1502 may filter the luminance information for the at least one region in the second intensity map if the luminance information for the at least one region is within the suitable luminance range. Further, step 1710 may be performed by processing unit 120 in FIG. 1. In some aspects, if the luminance information for the at least one region is within the suitable luminance range, the luminance information for the at least one region may be visually conducive to the display content associated with the scene. Also, if the luminance information for the at least one region is within the suitable luminance range, a grid-aligned section in the second intensity map may be associated with the at least one region.

At 1712, the GPU may process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range, as described in connection with the examples in FIGS. 1-15. For example, as described in 1560 of FIG. 15, GPU 1502 may process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range. Further, step 1712 may be performed by processing unit 120 in FIG. 1. In some aspects, processing the set of pixels corresponding to the section in the display may comprise transforming all of the set of pixels corresponding to the section in the display based on the luminance information for the at least one region being within the suitable luminance range. Also, the GPU (e.g., GPU 1502) may transmit, to the display, the transformed set of pixels corresponding to the section in the display. In some instances, transforming the set of pixels corresponding to the section in the display may comprise warping the set of pixels corresponding to the section in the display. Also, an amount of the transformed set of pixels may be associated with at least one of: head movement of the user of the device for the display content, body movement of the user of the device, or a surrounding environment of the user of the device. In some aspects, processing the set of pixels corresponding to the section in the display may comprise transforming a subset of pixels in the set of pixels corresponding to the section in the display based on the luminance information for the at least one region being outside of the suitable luminance range. Also, the GPU (e.g., GPU 1502) may transmit, to the display, the transformed subset of pixels corresponding to the section in the display. In some instances, the GPU (e.g., GPU 1502) may estimate a color value of a remaining amount of the set of pixels, where the remaining amount of the set of pixels is equal to an amount of the set of pixels that does not include the subset of pixels, where the estimated color value of the remaining amount of the set of pixels is interpolated based on the subset of pixels. Also, transforming the subset of pixels corresponding to the section in the display may comprise warping the subset of pixels corresponding to the section in the display. Further, an amount of the transformed subset of pixels may be associated with at least one of: head movement of the user of the device for the display content, body movement of the user of the device, or a surrounding environment of the user of the device. In some aspects, processing the set of pixels corresponding to the section in the display may comprise refraining from transforming a subset of pixels in the set of pixels corresponding to the section in the display based on the luminance information for the at least one region being outside of the suitable luminance range and being within the indistinguishable luminance range, where the indistinguishable luminance range is less than a minimum luminance threshold and greater than a maximum luminance threshold, and where the indistinguishable luminance range corresponds to a time for the user to distinguish the display content that is greater than a distinguishable time threshold.

At 1714, the GPU may output an indication of the set of processed pixels or the set of estimated transformation parameters, as described in connection with the examples in FIGS. 1-15. For example, as described in 1570 of FIG. 15, GPU 1502 may output an indication of the set of processed pixels or the set of estimated transformation parameters. Further, step 1714 may be performed by processing unit 120 in FIG. 1. In some aspects, outputting the indication of the set of processed pixels or the set of estimated transformation parameters may comprise transmitting, to at least one of: a warp engine or an application engine at a central processing unit (CPU), the indication of the set of processed pixels or the set of estimated transformation parameters. For example, GPU 1502 may transmit indication 1572 to CPU 1504. Also, outputting the indication of the set of processed pixels or the set of estimated transformation parameters may comprise storing, in a first memory or a cache, the indication of the set of processed pixels or the set of estimated transformation parameters. For example, GPU 1502 may store indication 1574 in memory 1506. Additionally, the set of transformation parameters may include at least one of: a set of scaling parameters or a set of translation parameters.

At 1716, the GPU may transform display content corresponding to the at least one region in the second intensity map based on the set of estimated transformation parameters, as described in connection with the examples in FIGS. 1-15. For example, as described in 1580 of FIG. 15, GPU 1502 may transform display content corresponding to the at least one region in the second intensity map based on the set of estimated transformation parameters. Further, step 1716 may be performed by processing unit 120 in FIG. 1. In some aspects, after the transformation, the GPU (e.g., GPU 1502) may transmit the transformed display content corresponding to the at least one region in the second intensity map.

Also, at 1716, the GPU may adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold, as described in connection with the examples in FIGS. 1-15. For example, as described in 1580 of FIG. 15, GPU 1502 may adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold. Further, step 1716 may be performed by processing unit 120 in FIG. 1. In some aspects, the GPU (e.g., GPU 1502) may estimate a set of updated transformation parameters associated with the luminance information for the at least one region based on the adjusted location of the display content corresponding to the at least one region. The GPU (e.g., GPU 1502) may also output the set of estimated updated transformation parameters associated with the luminance information for the at least one region.

In configurations, a method or an apparatus for data or graphics processing is provided. The apparatus may be a GPU (or other graphics processor), a CPU (or other central processor), a DDIC, an apparatus for graphics processing, and/or some other processor that may perform data or graphics processing. In aspects, the apparatus may be the processing unit 120 within the device 104, or may be some other hardware within the device 104 or another device. The apparatus, e.g., processing unit 120, may include means for obtaining a first intensity map associated with luminance information for a scene including a plurality of frames, where the first intensity map corresponds to a camera associated with the scene. The apparatus, e.g., processing unit 120, may also include means for configuring a second intensity map based on the first intensity map and at least one coordinate frame from a perspective of a user of a device for display content associated with the scene, where the second intensity map is associated with the luminance information for the scene. The apparatus, e.g., processing unit 120, may also include means for determining whether luminance information for at least one region in the second intensity map is within a suitable luminance range for the display content associated with the scene. The apparatus, e.g., processing unit 120, may also include means for processing a set of pixels corresponding to a section in a display that is associated with the at least one region based on the luminance information for the at least one region being at least one of within the suitable luminance range, outside of the suitable luminance range, or within an indistinguishable luminance range; or means for estimating a set of transformation parameters associated with the luminance information for the at least one region in the second intensity map based on whether the luminance information for the at least one region is within the suitable luminance range. The apparatus, e.g., processing unit 120, may also include means for outputting an indication of the set of processed pixels or the set of estimated transformation parameters. The apparatus, e.g., processing unit 120, may also include means for identifying the section in the display that is associated with the at least one region based on the luminance information for the at least one region being within the suitable luminance range or outside of the suitable luminance range. The apparatus, e.g., processing unit 120, may also include means for filtering the luminance information for the at least one region in the second intensity map if the luminance information for the at least one region is within the suitable luminance range. The apparatus, e.g., processing unit 120, may also include means for adjusting a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold. The apparatus, e.g., processing unit 120, may also include means for transforming display content corresponding to the at least one region in the second intensity map based on the set of estimated transformation parameters.

The subject matter described herein may be implemented to realize one or more benefits or advantages. For instance, the described graphics or display processing techniques may be used by a GPU, a CPU, a central processor, or some other processor that may perform graphics or display processing to implement the content reprojection techniques described herein. This may also be accomplished at a low cost compared to other graphics or display processing techniques. Moreover, the graphics or display processing techniques herein may improve or speed up data processing or execution. Further, the graphics or display processing techniques herein may improve resource or data utilization and/or resource efficiency. Additionally, aspects of the present disclosure may utilize content reprojection techniques in order to improve memory bandwidth efficiency and/or increase processing speed at a cache, a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including at least one memory and at least one processor coupled to the at least one memory and, based at least in part on information stored in the at least one memory, the at least one processor, individually or in any combination, is configured to: obtain a first intensity map associated with luminance information for a scene including a plurality of frames, wherein the first intensity map corresponds to a camera associated with the scene; configure a second intensity map based on the first intensity map and at least one coordinate frame from a perspective of a user of a device for display content associated with the scene, wherein the second intensity map is associated with the luminance information for the scene; determine whether luminance information for at least one region in the second intensity map is within a suitable luminance range for the display content associated with the scene; process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range; and output an indication of the set of processed pixels or the set of estimated transformation parameters.

Aspect 2 is the apparatus of aspect 1, wherein to process the set of pixels corresponding to the section in the display, the at least one processor, individually or in any combination, is configured to: transform all of the set of pixels corresponding to the section in the display based on the luminance information for the at least one region being within the suitable luminance range.

Aspect 3 is the apparatus of aspect 2, wherein the at least one processor, individually or in any combination, is further configured to: transmit, to the display, the transformed set of pixels corresponding to the section in the display.

Aspect 4 is the apparatus of any of aspects 2 to 3, wherein to transform the set of pixels corresponding to the section in the display, the at least one processor, individually or in any combination, is configured to: warp the set of pixels corresponding to the section in the display.

Aspect 5 is the apparatus of any of aspects 2 to 4, wherein an amount of the transformed set of pixels is associated with at least one of: head movement of the user of the device for the display content, body movement of the user of the device, or a surrounding environment of the user of the device.

Aspect 6 is the apparatus of any of aspects 1 to 5, wherein to process the set of pixels corresponding to the section in the display, the at least one processor, individually or in any combination, is configured to: transform a subset of pixels in the set of pixels corresponding to the section in the display based on the luminance information for the at least one region being outside of the suitable luminance range.

Aspect 7 is the apparatus of aspect 6, wherein the at least one processor, individually or in any combination, is further configured to: transmit, to the display, the transformed subset of pixels corresponding to the section in the display.

Aspect 8 is the apparatus of any of aspects 6 to 7, wherein the at least one processor, individually or in any combination, is further configured to: estimate a color value of a remaining amount of the set of pixels, wherein the remaining amount of the set of pixels is equal to an amount of the set of pixels that does not include the subset of pixels, wherein the estimated color value of the remaining amount of the set of pixels is interpolated based on the subset of pixels.

Aspect 9 is the apparatus of any of aspects 6 to 8, wherein to transform the subset of pixels corresponding to the section in the display, the at least one processor, individually or in any combination, is configured to: warp the subset of pixels corresponding to the section in the display.

Aspect 10 is the apparatus of any of aspects 6 to 9, wherein an amount of the transformed subset of pixels is associated with at least one of: head movement of the user of the device for the display content, body movement of the user of the device, or a surrounding environment of the user of the device.

Aspect 11 is the apparatus of any of aspects 1 to 10, wherein to process the set of pixels corresponding to the section in the display, the at least one processor, individually or in any combination, is configured to: refrain from transforming a subset of pixels in the set of pixels corresponding to the section in the display based on the luminance information for the at least one region being outside of the suitable luminance range and being within the indistinguishable luminance range, wherein the indistinguishable luminance range is less than a minimum luminance threshold and greater than a maximum luminance threshold, and wherein the indistinguishable luminance range corresponds to a time for the user to distinguish the display content that is greater than a distinguishable time threshold.

Aspect 12 is the apparatus of any of aspects 1 to 11, wherein the at least one processor, individually or in any combination, is further configured to: identify the section in the display that is associated with the at least one region based on the luminance information for the at least one region being within the suitable luminance range or outside of the suitable luminance range, and wherein to process the set of pixels, the at least one processor is configured to process the set of pixels based on the identification of the section in the display.

Aspect 13 is the apparatus of any of aspects 1 to 12, wherein to determine whether the luminance information for the at least one region in the second intensity map is within the suitable luminance range, the at least one processor, individually or in any combination, is configured to: transmit a first indication of the luminance information for the at least one region; and receive a second indication of whether the luminance information for the at least one region in the second intensity map is within the suitable luminance range for the display content.

Aspect 14 is the apparatus of aspect 13, wherein to receive the second indication, the at least one processor, individually or in any combination, is configured to: receive the second indication from a graphics processing unit (GPU) or an application engine at a central processing unit (CPU).

Aspect 15 is the apparatus of any of aspects 1 to 14, wherein to configure the second intensity map, the at least one processor, individually or in any combination, is configured to: transform the first intensity map to generate the second intensity map based on the first intensity map and the at least one coordinate frame from the perspective of the user of the device for the display content associated with the scene.

Aspect 16 is the apparatus of any of aspects 1 to 15, further comprising at least one of an antenna or a transceiver coupled to the at least one processor, wherein to obtain the first intensity map, the at least one processor, individually or in any combination, is configured to: obtain, via at least one of the antenna or the transceiver, the first intensity map from a set of camera sensors for the camera associated with the scene.

Aspect 17 is the apparatus of any of aspects 1 to 16, wherein the suitable luminance range is greater than a minimum luminance threshold and less than a maximum luminance threshold, and wherein at least one of the minimum luminance threshold or the maximum luminance threshold is an application-defined threshold or a user-defined threshold.

Aspect 18 is the apparatus of any of aspects 1 to 17, wherein the at least one processor, individually or in any combination, is further configured to: filter the luminance information for the at least one region in the second intensity map if the luminance information for the at least one region is within the suitable luminance range.

Aspect 19 is the apparatus of aspect 18, wherein, if the luminance information for the at least one region is within the suitable luminance range, the luminance information for the at least one region is visually conducive to the display content associated with the scene.

Aspect 20 is the apparatus of aspect 18, wherein, if the luminance information for the at least one region is within the suitable luminance range, a grid-aligned section in the second intensity map is associated with the at least one region.

Aspect 21 is the apparatus of any of aspects 1 to 20, wherein the at least one processor, individually or in any combination, is further configured to: adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold.

Aspect 22 is the apparatus of aspect 21, wherein the at least one processor, individually or in any combination, is further configured to: estimate a set of updated transformation parameters associated with the luminance information for the at least one region based on the adjusted location of the display content corresponding to the at least one region; and output the set of estimated updated transformation parameters associated with the luminance information for the at least one region.

Aspect 23 is the apparatus of any of aspects 1 to 22, wherein the at least one processor, individually or in any combination, is further configured to: transform display content corresponding to the at least one region in the second intensity map based on the set of estimated transformation parameters.

Aspect 24 is the apparatus of aspect 23, wherein the at least one processor, individually or in any combination, is further configured to: transmit the transformed display content corresponding to the at least one region in the second intensity map.

Aspect 25 is the apparatus of any of aspects 1 to 24, wherein the set of transformation parameters includes at least one of: a set of scaling parameters or a set of translation parameters.

Aspect 26 is the apparatus of any of aspects 1 to 25, wherein to output the indication of the set of processed pixels or the set of estimated transformation parameters, the at least one processor, individually or in any combination, is configured to: transmit, to at least one of: a warp engine or an application engine at a central processing unit (CPU), the indication of the set of processed pixels or the set of estimated transformation parameters.

Aspect 27 is the apparatus of any of aspects 1 to 26, wherein to output the indication of the set of processed pixels or the set of estimated transformation parameters, the at least one processor, individually or in any combination, is configured to: store, in a first memory or a cache, the indication of the set of processed pixels or the set of estimated transformation parameters.

Aspect 28 is a method of display processing for implementing any of aspects 1 to 27.

Aspect 29 is an apparatus for display processing including means for implementing any of aspects 1 to 27.

Aspect 30 is a computer-readable medium (e.g., a non-transitory computer-readable medium) storing computer executable code (e.g., code for display processing), the code when executed by at least one processor causes the at least one processor to implement any of aspects 1 to 27.

What is claimed is:

1. An apparatus for display processing, comprising:
at least one memory; and
at least one processor coupled to the at least one memory and, based at least in part on information stored in the at least one memory, the at least one processor, individually or in any combination, is configured to:
obtain a first intensity map associated with luminance information for a scene including a plurality of frames, wherein the first intensity map corresponds to a camera associated with the scene;
configure a second intensity map based on the first intensity map and at least one coordinate frame from a perspective of a user of a device for display content associated with the scene, wherein the second intensity map is associated with the luminance information for the scene;
determine whether luminance information for at least one region in the second intensity map is within a suitable luminance range for the display content associated with the scene;
process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range; and
output an indication of the set of processed pixels or the set of estimated transformation parameters.

2. The apparatus of claim 1, wherein to process the set of pixels corresponding to the section in the display, the at least one processor, individually or in any combination, is configured to: transform all of the set of pixels corresponding to the section in the display based on the luminance information for the at least one region being within the suitable luminance range.

3. The apparatus of claim 2, wherein the at least one processor, individually or in any combination, is further configured to:
transmit, to the display, the transformed set of pixels corresponding to the section in the display.

4. The apparatus of claim 2, wherein to transform the set of pixels corresponding to the section in the display, the at least one processor, individually or in any combination, is configured to: warp the set of pixels corresponding to the section in the display.

5. The apparatus of claim 2, wherein an amount of the transformed set of pixels is associated with at least one of: head movement of the user of the device for the display content, body movement of the user of the device, or a surrounding environment of the user of the device.

6. The apparatus of claim 1, wherein to process the set of pixels corresponding to the section in the display, the at least one processor, individually or in any combination, is configured to: transform a subset of pixels in the set of pixels corresponding to the section in the display based on the luminance information for the at least one region being outside of the suitable luminance range.

7. The apparatus of claim 6, wherein the at least one processor, individually or in any combination, is further configured to:
transmit, to the display, the transformed subset of pixels corresponding to the section in the display.

8. The apparatus of claim 6, wherein the at least one processor, individually or in any combination, is further configured to:
estimate a color value of a remaining amount of the set of pixels, wherein the remaining amount of the set of pixels is equal to an amount of the set of pixels that does not include the subset of pixels, wherein the estimated color value of the remaining amount of the set of pixels is interpolated based on the subset of pixels.

9. The apparatus of claim 6, wherein to transform the subset of pixels corresponding to the section in the display, the at least one processor, individually or in any combination, is configured to: warp the subset of pixels corresponding to the section in the display.

10. The apparatus of claim 6, wherein an amount of the transformed subset of pixels is associated with at least one of: head movement of the user of the device for the display content, body movement of the user of the device, or a surrounding environment of the user of the device.

11. The apparatus of claim 1, wherein to process the set of pixels corresponding to the section in the display, the at least one processor, individually or in any combination, is configured to: refrain from transforming a subset of pixels in the set of pixels corresponding to the section in the display based on the luminance information for the at least one region being outside of the suitable luminance range and being within the indistinguishable luminance range, wherein the indistinguishable luminance range is less than a minimum luminance threshold and greater than a maximum luminance threshold, and wherein the indistinguishable luminance range corresponds to a time for the user to distinguish the display content that is greater than a distinguishable time threshold.

12. The apparatus of claim 1, wherein the at least one processor, individually or in any combination, is further configured to:
identify the section in the display that is associated with the at least one region based on the luminance information for the at least one region being within the suitable luminance range or outside of the suitable luminance range, and wherein to process the set of pixels, the at least one processor is configured to process the set of pixels based on the identification of the section in the display.

13. The apparatus of claim 1, wherein to determine whether the luminance information for the at least one region in the second intensity map is within the suitable luminance range, the at least one processor, individually or in any combination, is configured to:
transmit a first indication of the luminance information for the at least one region; and
receive a second indication of whether the luminance information for the at least one region in the second intensity map is within the suitable luminance range for the display content.

14. The apparatus of claim 13, wherein to receive the second indication, the at least one processor, individually or in any combination, is configured to: receive the second indication from a graphics processing unit (GPU) or an application engine at a central processing unit (CPU).

15. The apparatus of claim 1, wherein to configure the second intensity map, the at least one processor, individually or in any combination, is configured to: transform the first intensity map to generate the second intensity map based on the first intensity map and the at least one coordinate frame from the perspective of the user of the device for the display content associated with the scene.

16. The apparatus of claim 1, further comprising at least one of an antenna or a transceiver coupled to the at least one processor, wherein to obtain the first intensity map, the at least one processor, individually or in any combination, is configured to: obtain, via at least one of the antenna or the transceiver, the first intensity map from a set of camera sensors for the camera associated with the scene.

17. The apparatus of claim 1, wherein the suitable luminance range is greater than a minimum luminance threshold and less than a maximum luminance threshold, and wherein at least one of the minimum luminance threshold or the maximum luminance threshold is an application-defined threshold or a user-defined threshold.

18. The apparatus of claim 1, wherein the at least one processor, individually or in any combination, is further configured to:
filter the luminance information for the at least one region in the second intensity map if the luminance information for the at least one region is within the suitable luminance range.

19. The apparatus of claim 18, wherein, if the luminance information for the at least one region is within the suitable luminance range, the luminance information for the at least one region is visually conducive to the display content associated with the scene.

20. The apparatus of claim 18, wherein, if the luminance information for the at least one region is within the suitable luminance range, a grid-aligned section in the second intensity map is associated with the at least one region.

21. The apparatus of claim 1, wherein the at least one processor, individually or in any combination, is further configured to:
adjust a location of display content corresponding to the at least one region in the second intensity map if at least one of: (1) a frequency of change in a set of display coordinates for the display content corresponding to the at least one region is less than a frequency threshold, or (2) a size of the display content corresponding to the at least one region is greater than a size threshold.

22. The apparatus of claim 21, wherein the at least one processor, individually or in any combination, is further configured to:
estimate a set of updated transformation parameters associated with the luminance information for the at least one region based on the adjusted location of the display content corresponding to the at least one region; and
output the set of estimated updated transformation parameters associated with the luminance information for the at least one region.

23. The apparatus of claim 1, wherein the at least one processor, individually or in any combination, is further configured to:
transform display content corresponding to the at least one region in the second intensity map based on the set of estimated transformation parameters.

24. The apparatus of claim 23, wherein the at least one processor, individually or in any combination, is further configured to:
transmit the transformed display content corresponding to the at least one region in the second intensity map.

25. The apparatus of claim 1, wherein the set of transformation parameters includes at least one of: a set of scaling parameters or a set of translation parameters.

26. The apparatus of claim 1, wherein to output the indication of the set of processed pixels or the set of estimated transformation parameters, the at least one processor, individually or in any combination, is configured to:
transmit, to at least one of: a warp engine or an application engine at a central processing unit (CPU), the indication of the set of processed pixels or the set of estimated transformation parameters.

27. The apparatus of claim 1, wherein to output the indication of the set of processed pixels or the set of estimated transformation parameters, the at least one processor, individually or in any combination, is configured to:
store, in a first memory or a cache, the indication of the set of processed pixels or the set of estimated transformation parameters.

28. A method of display processing, comprising:
obtaining a first intensity map associated with luminance information for a scene including a plurality of frames, wherein the first intensity map corresponds to a camera associated with the scene;
configuring a second intensity map based on the first intensity map and at least one coordinate frame from a perspective of a user of a device for display content associated with the scene, wherein the second intensity map is associated with the luminance information for the scene;
determining whether luminance information for at least one region in the second intensity map is within a suitable luminance range for the display content associated with the scene;
processing a set of pixels corresponding to a section in a display that is associated with the at least one region based on the luminance information for the at least one region being at least one of within the suitable luminance range, outside of the suitable luminance range, or within an indistinguishable luminance range; or estimating a set of transformation parameters associated with the luminance information for the at least one region in the second intensity map based on whether the luminance information for the at least one region is within the suitable luminance range; and
outputting an indication of the set of processed pixels or the set of estimated transformation parameters.

29. An apparatus for display processing, comprising:
means for obtaining a first intensity map associated with luminance information for a scene including a plurality of frames, wherein the first intensity map corresponds to a camera associated with the scene;
means for configuring a second intensity map based on the first intensity map and at least one coordinate frame from a perspective of a user of a device for display content associated with the scene, wherein the second intensity map is associated with the luminance information for the scene;
means for determining whether luminance information for at least one region in the second intensity map is within a suitable luminance range for the display content associated with the scene;
means for processing a set of pixels corresponding to a section in a display that is associated with the at least one region based on the luminance information for the at least one region being at least one of within the suitable luminance range, outside of the suitable luminance range, or within an indistinguishable luminance range; or means for estimating a set of transformation parameters associated with the luminance information for the at least one region in the second intensity map based on whether the luminance information for the at least one region is within the suitable luminance range; and
means for outputting an indication of the set of processed pixels or the set of estimated transformation parameters.

30. A computer-readable medium storing computer executable code for display processing, the code when executed by at least one processor causes the at least one processor to:
obtain a first intensity map associated with luminance information for a scene including a plurality of frames, wherein the first intensity map corresponds to a camera associated with the scene;
configure a second intensity map based on the first intensity map and at least one coordinate frame from a perspective of a user of a device for display content associated with the scene, wherein the second intensity map is associated with the luminance information for the scene;
determine whether luminance information for at least one region in the second intensity map is within a suitable luminance range for the display content associated with the scene;
process a set of pixels corresponding to a section in a display that is associated with the at least one region based on the luminance information for the at least one region being at least one of within the suitable luminance range, outside of the suitable luminance range, or within an indistinguishable luminance range; or estimate a set of transformation parameters associated with the luminance information for the at least one region in the second intensity map based on whether the luminance information for the at least one region is within the suitable luminance range; and
output an indication of the set of processed pixels or the set of estimated transformation parameters.

* * * * *